(12) United States Patent
Moilanen et al.

(10) Patent No.: US 7,032,944 B2
(45) Date of Patent: Apr. 25, 2006

(54) MODULAR STAMPED PARTS TRANSFER GRIPPER

(75) Inventors: Steven M. Moilanen, Fort Wayne, IN (US); Bruce D. McIntosh, Monroeville, IN (US)

(73) Assignee: PHD, Inc., Fort Wayne, IN (US)

( * ) Notice: Subject to any disclaimer, the term of this patent is extended or adjusted under 35 U.S.C. 154(b) by 0 days.

(21) Appl. No.: 10/614,607

(22) Filed: Jul. 7, 2003

(65) Prior Publication Data

US 2004/0004366 A1    Jan. 8, 2004

Related U.S. Application Data

(63) Continuation of application No. 09/714,354, filed on Nov. 16, 2000, now Pat. No. 6,588,816, which is a continuation-in-part of application No. 09/483,794, filed on Jan. 14, 2000, now Pat. No. 6,227,586, which is a continuation of application No. 08/981,863, filed as application No. PCT/US97/17795 on Oct. 3, 1997, now Pat. No. 6,048,013.

(60) Provisional application No. 60/039,088, filed on Mar. 14, 1997, provisional application No. 60/027,668, filed on Oct. 7, 1996.

(51) Int. Cl.
*B25J 15/00*    (2006.01)

(52) U.S. Cl. .......................... 294/88; 294/116

(58) Field of Classification Search .................. 294/88, 294/115, 116, 106; 269/32, 34
See application file for complete search history.

(56) References Cited

U.S. PATENT DOCUMENTS

| | | | |
|---|---|---|---|
| 294,736 A | 3/1884 | Hyle | |
| 886,003 A * | 4/1908 | Kraft | 294/19.3 |
| 906,507 A | 12/1908 | Canedy | |
| 2,222,941 A | 11/1940 | Freeman | |
| 2,326,962 A | 8/1943 | Meier | |
| 2,492,558 A | 12/1949 | Deubler, Jr. | |
| 2,796,787 A | 6/1957 | Aske | |
| 2,817,556 A * | 12/1957 | White | 294/116 |
| 3,350,132 A | 10/1967 | Ashton | |
| 3,482,830 A * | 12/1969 | Sendoykas | 269/32 |
| 3,570,835 A * | 3/1971 | McPherson | 269/32 |
| 3,635,514 A | 1/1972 | Blatt | |
| 4,109,953 A | 8/1978 | Seymour | |
| 4,363,475 A | 12/1982 | McCarty | |
| 4,462,581 A | 7/1984 | Mitani | |
| 4,475,607 A | 10/1984 | Haney | |
| 4,494,739 A * | 1/1985 | Valentine | 269/32 |
| 4,519,279 A | 5/1985 | Ruggeri | |
| 4,529,182 A | 7/1985 | Valentine | |
| 4,596,415 A | 6/1986 | Blatt | |
| 4,650,237 A | 3/1987 | Lessway | |
| 4,886,635 A | 12/1989 | Forster et al. | |

(Continued)

FOREIGN PATENT DOCUMENTS

DE    853091    8/1952
GB    2 041 263 A    9/1980

(Continued)

*Primary Examiner*—Dean J. Kramer
(74) *Attorney, Agent, or Firm*—Barnes & Thornburg LLP

(57) ABSTRACT

A gripper assembly is provided having an actuator, at least one jaw member and a cam pin. The jaw member includes a cam slot that is a space formed by opposed cam walls located in the jaw arm. The cam walls form a locking portion and a pivoting portion, wherein the distance between the cam walls of the locking portion is substantially equal to the distance between the cam walls of the pivoting portion.

15 Claims, 18 Drawing Sheets

U.S. PATENT DOCUMENTS

| | | | |
|---|---|---|---|
| 4,887,612 A * | 12/1989 | Esser et al. | 600/564 |
| 5,085,480 A | 2/1992 | Jackson | |
| 5,193,789 A * | 3/1993 | Tucker | 269/32 |
| 5,248,177 A * | 9/1993 | Jones et al. | 294/88 |
| 5,261,715 A | 11/1993 | Blatt et al. | |
| 5,271,651 A | 12/1993 | Blatt et al. | |
| 5,284,375 A | 2/1994 | Land, III | |
| 5,299,847 A | 4/1994 | Blatt et al. | |
| 5,301,533 A * | 4/1994 | Jackson | 72/328 |
| 5,503,378 A | 4/1996 | Schauss et al. | |
| 5,516,173 A | 5/1996 | Sawdon | |
| 5,647,625 A | 7/1997 | Sawdon | |
| 5,938,259 A | 8/1999 | Sawdon et al. | |
| 5,956,992 A * | 9/1999 | Patton | 72/392 |

FOREIGN PATENT DOCUMENTS

| | | | | |
|---|---|---|---|---|
| SU | 624-867 | * | 9/1978 | 294/116 |
| SU | 1127-753 | * | 12/1984 | 294/116 |

\* cited by examiner

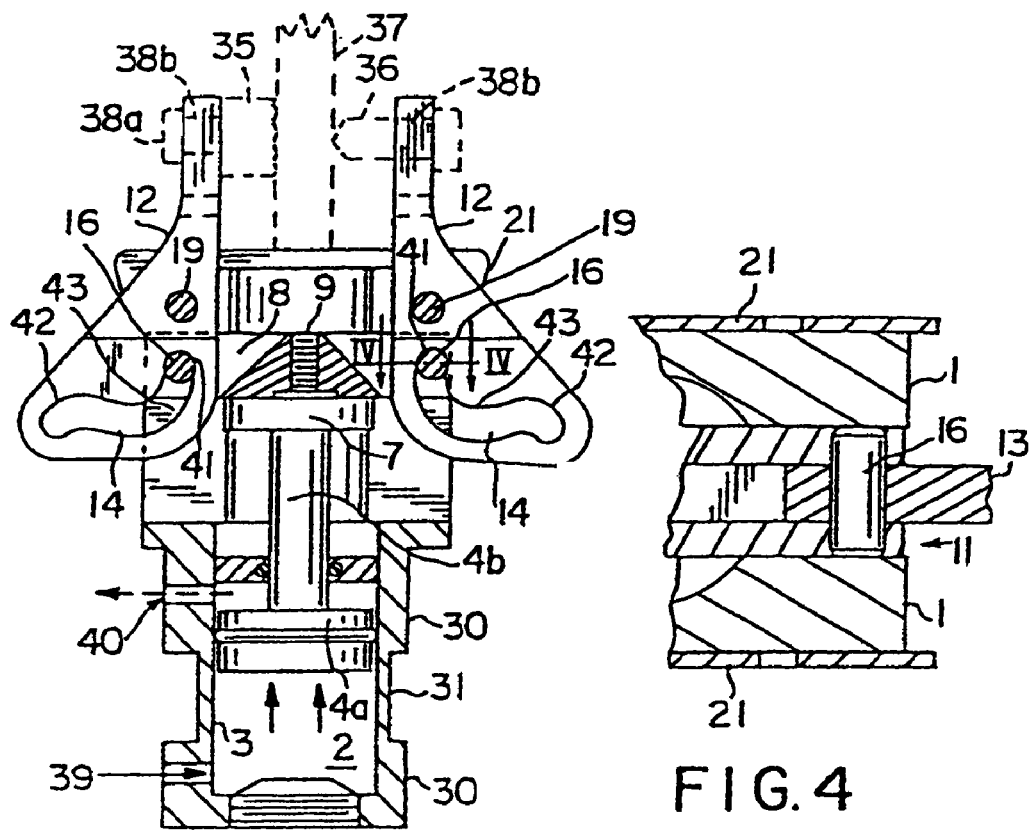
FIG. 2
FIG. 4
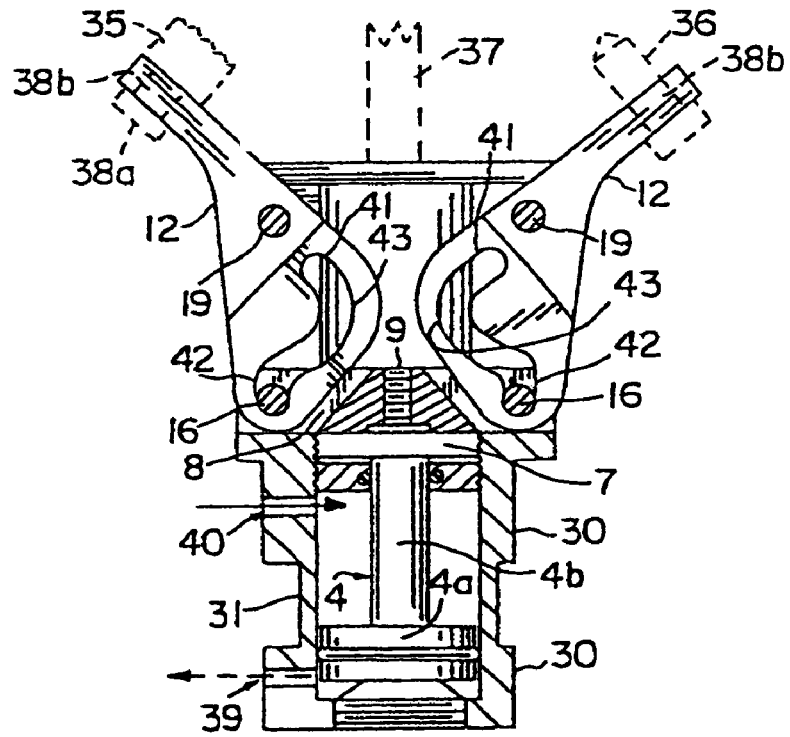
FIG. 3

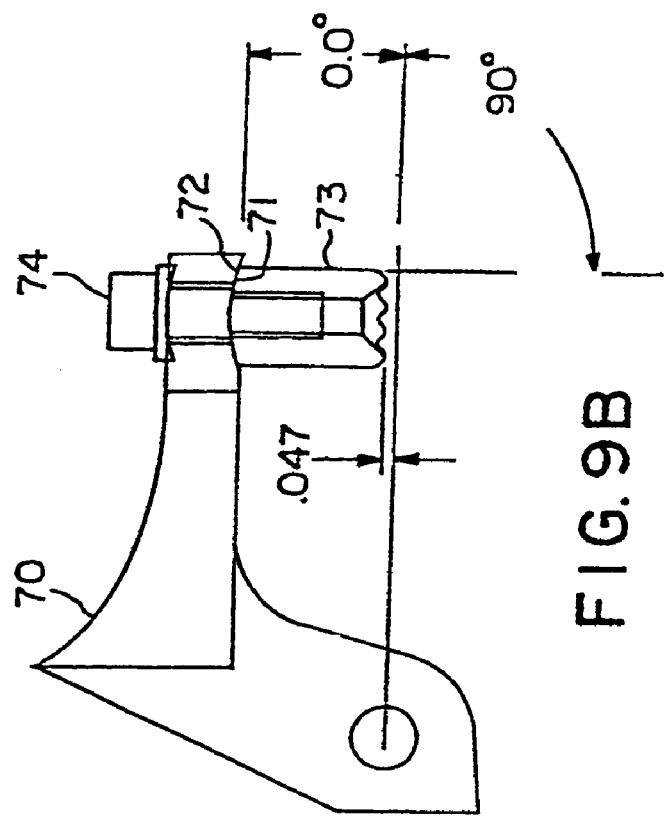
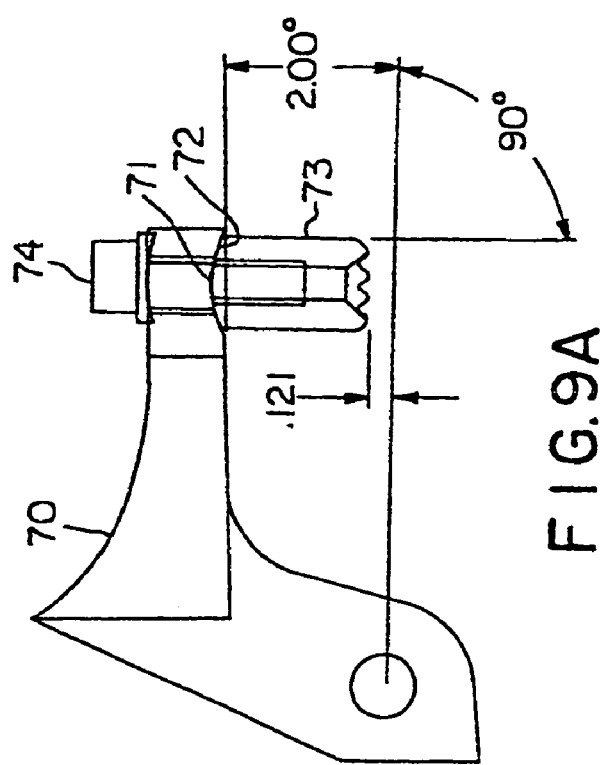

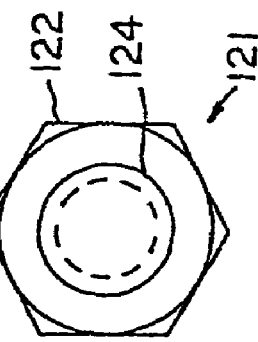
FIG.13C
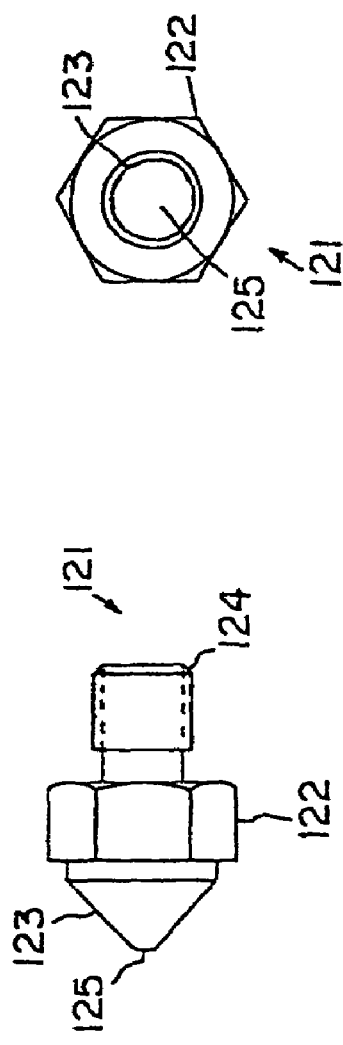
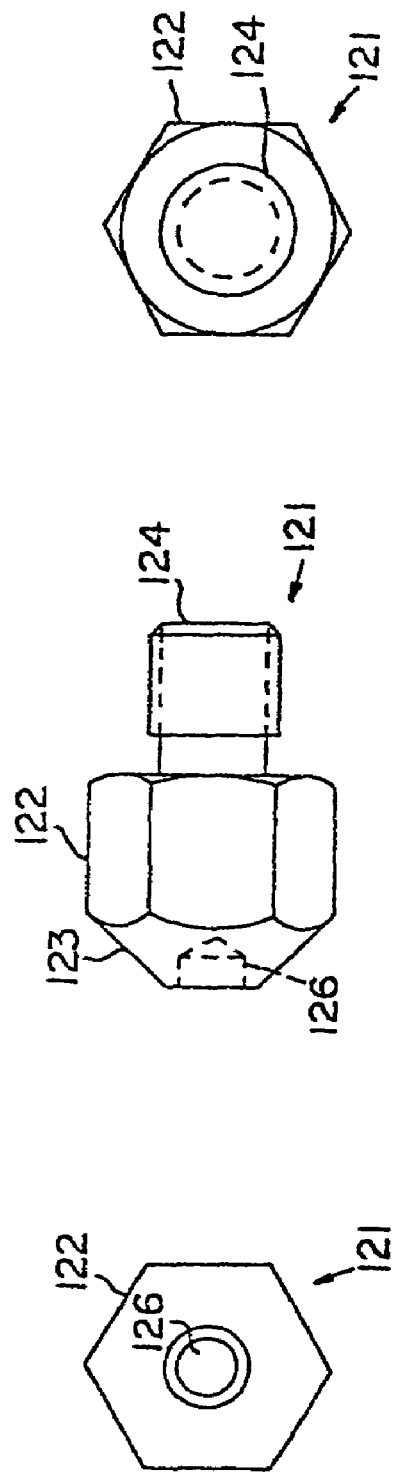

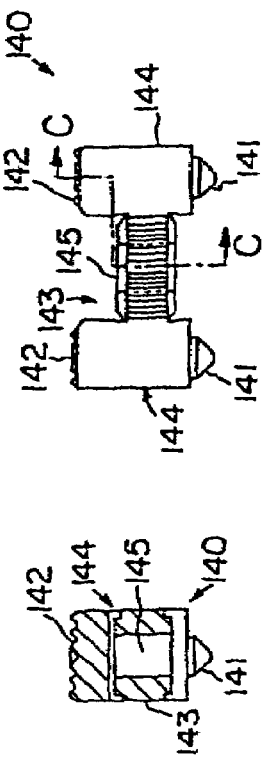
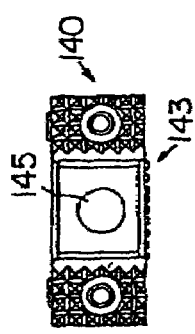
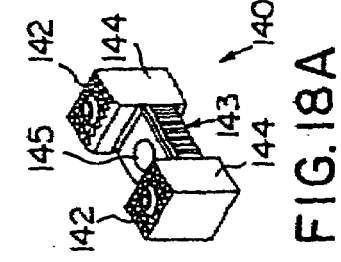
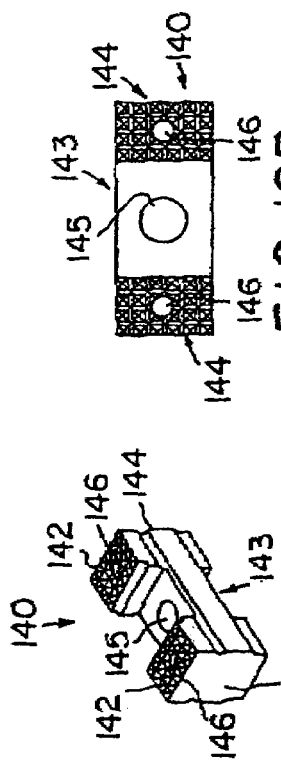
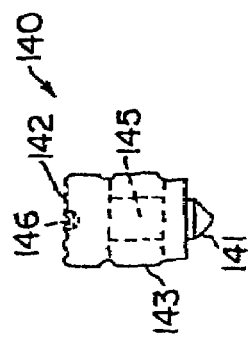
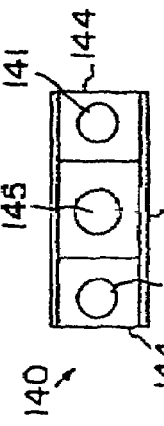

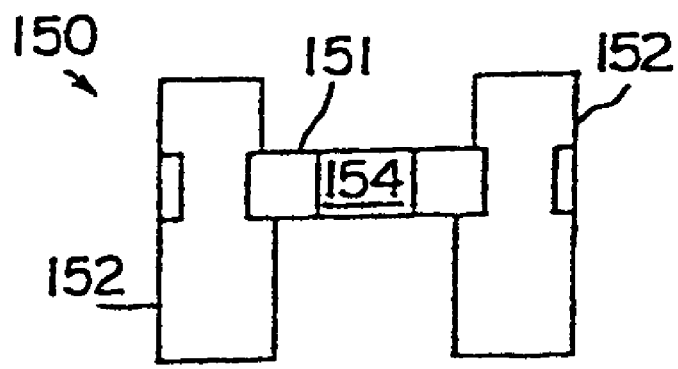
F I G. 20A
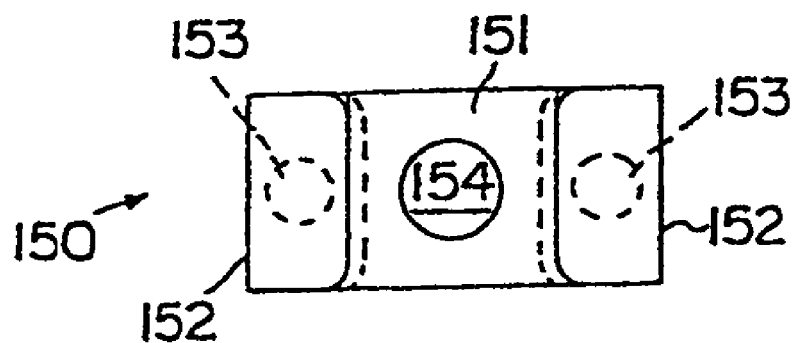
F I G. 20B
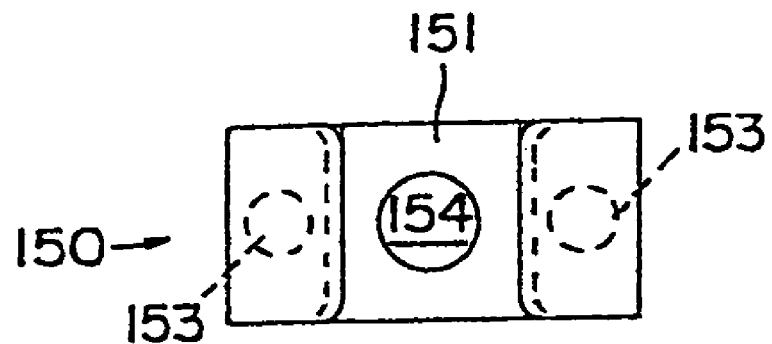
F I G. 20C

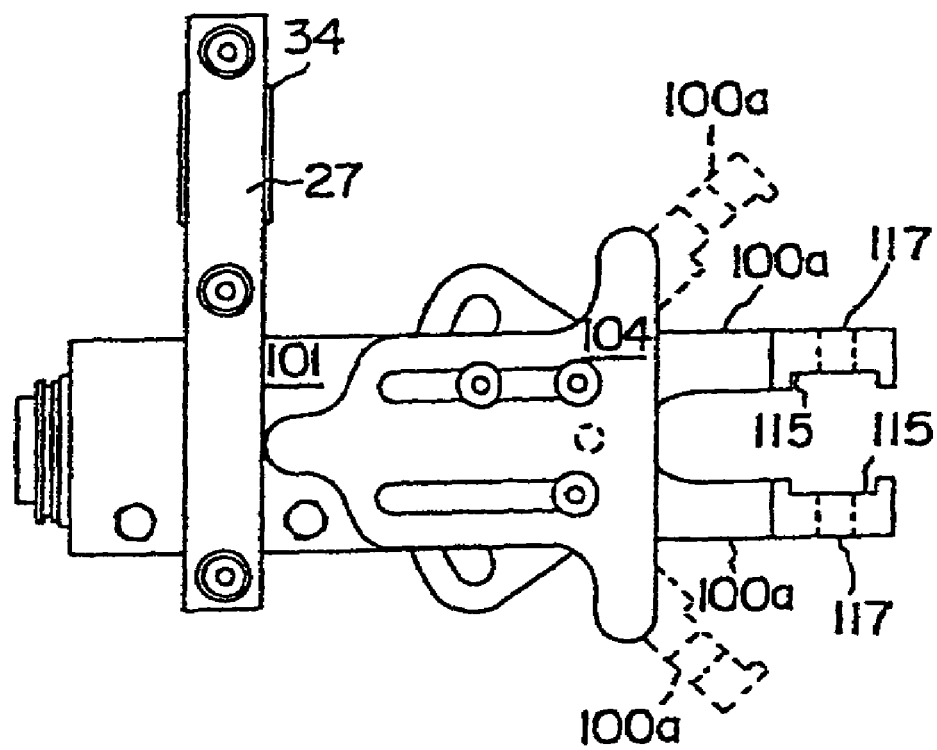
F I G. 21A
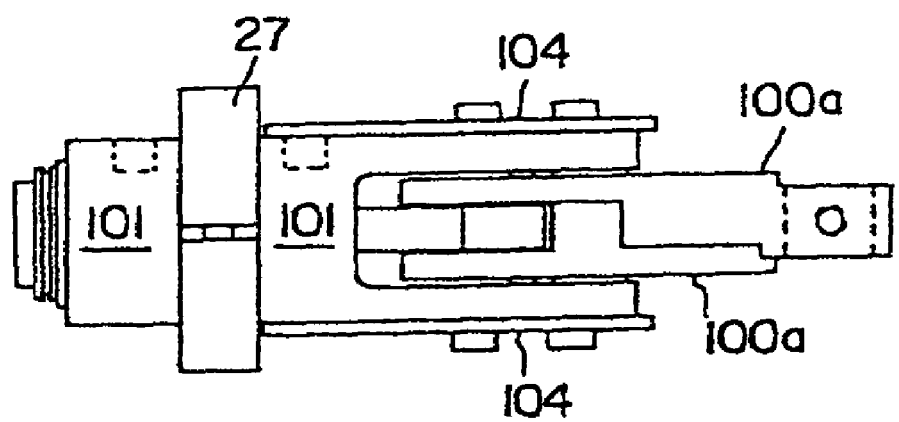
F I G. 21B

MODULAR STAMPED PARTS TRANSFER GRIPPER

RELATED APPLICATION

The present application is a Continuation of U.S. patent application, Ser. No. 09/714,354, filed on Nov. 16, 2000 now U.S. Pat. No. 6,588,816, entitled Modular Stamped Parts Transfer Gripper, which is a Continuation-in-Part of U.S. patent application, Ser. No. 09/483,794, filed Jan. 14, 2000, entitled Modular Stamped Parts Transfer Gripper, (now U.S. Pat. No. 6,227,586, issued on May 8, 2001), which is a Continuation of U.S. patent application Ser. No. 08/981,863, filed on Aug. 4, 1998, entitled Modular Stamped Parts Transfer Gripper (now U.S. Pat. No. 6,048,013, issued on Apr. 11, 2000), which is related to and claims priority to PCT Application No. US97/17795 (WO98/15392), filed on Oct. 3, 1997, which is related to and claims priority to U.S. Provisional Patent Application, Ser. No. 60/039,088, filed Mar. 14, 1997, entitled Modular Stamped Parts Transfer Gripper, and to U.S. Provisional Patent Application Ser. No. 60/027,668 filed Oct. 7, 1996, entitled Stamped Parts Transfer Gripper. To the extent not included below, the subject matter disclosed in those applications is hereby expressly incorporated into the present application.

TECHNICAL FIELD

The present invention relates to fluid pressure actuated grippers of the type employed in automated workpiece handling devices which clampingly grip and transfer a workpiece from one station to another. More particularly, the present invention relates to fluid pressure actuated grippers which can be locked in either or both of their closed or open positions and which are assembled from a plurality of modular or interchangeable components.

BACKGROUND AND SUMMARY

Fluid pressure actuated grippers are widely employed and typically take the form of a pneumatic or hydraulic differential motor whose cylinder is fixedly mounted to a transfer device. At the forward or rod end of the cylinder housing, a gripper jaw mounting structure is fixedly mounted on the cylinder to pivotally support a pair of opposed gripper jaws which are coupled to the piston rod of the motor by a linkage so arranged that, upon movement of the piston in one direction, the jaws are pivoted to an open position, and, upon movement of the piston in the opposite direction, the jaws are driven to a closed workpiece gripping position.

In typical operation, the gripper jaws will be closed upon a workpiece near the edge of the workpiece, and the gripper will be advanced to position the gripped workpiece in operative relationship with a work station. The gripper will then be opened to release the workpiece, and the transfer device will retract the gripper from the work station while the work operation is performed. At the conclusion of the work operation, the gripper will then advance back into the work station and the jaws will again close upon the workpiece and carry it away from the work station. Opening and closing the gripper jaws, thus, takes place when the gripper is in its closest proximity to tooling at the work station.

There are basically two types of linkage arrangements used in fluid pressure actuated grippers to connect the gripper jaws to the piston rods and effect movement of the gripper jaws. These are pivotable link arrangements and pivotal cam arrangements. An example of a pivotal link arrangement can be found in U.S. Pat. No. 5,152,568 to Blatt which discloses pivotal links 36 and 40 that cooperate with gripper jaws 12A and 12B, as shown in FIG. 3.

U.S. Pat. No. 4,518,187 to Blatt, et al. discloses a pivotal cam arrangement in which jaw plates 45 and 47 are pivoted by the cooperation of cam slots 61 provided in the jaw plates and a pivot pin 37 (and rollers 39) attached to the piston rod.

In a typical production line, there are numerous work stations with one or more fluid pressure actuated gripper devices positioned between adjacent work stations. During operation, all of the gripper devices are synchronized so that they simultaneously remove a workpiece from one work station and transfer the workpiece to the next work station. In such an operation, a problem can occur if any one of the gripper devices fails to properly grip a workpiece. For example, if a workpiece slips from its initial gripped position, it can become sufficiently out of alignment to prevent its transfer to a succeeding gripper device. A more serious problem can occur if a workpiece is transferred in a misaligned manner and subsequently positioned at a work station in a misaligned fashion. Such an incident can damage the work station. Another problem which can occur is completely losing grip of a workpiece and dropping the workpiece. Losing grip of a workpiece can occur when there is a leak or failure of fluid pressure supplied to the piston rod actuator.

Fluid pressure actuated grippers are generally designed for use with particular workpieces to be transferred and with specific work stations. For example, some workpieces and/or work stations may require wider or narrower gripper jaws, different types of gripper jaws, gripper jaws that open at different angles, different clearance requirements, etc. Because of the wide variety of design or performance options required of grippers, manufacturing facilities which utilize fluid actuated grippers typically have numerous sets of grippers which are designed to transport different workpieces between specific work stations. The requirement of stocking multiple sets of grippers adds to the manufacturer's costs.

The present invention is directed to fluid pressure actuated grippers which overcome and prevent problems associated with fluid pressure leaks or failures. Moreover, the present invention is directed to fluid pressure actuated grippers which are assembled from a plurality of modular or interchangeable components.

In one illustrative embodiment of the disclosure, a gripper assembly is provided comprising a body, an actuator, at least one jaw member and a cam pin. The body is coupled to the actuator. The jaw member is pivotal with respect to the body. The jaw member comprises a cam slot. The cam slot is a space formed by opposed cam walls located in the jaw arm. The cam walls form a locking portion and a pivoting portion, wherein the distance between the cam walls of the locking portion is substantially equal to the distance between the cam walls of the pivoting portion. The cam pin is attached to the actuator, wherein a portion the cam pin is located and movable in the cam slot.

In this and other illustrative embodiments, the gripper assembly may provide: a locking portion being substantially a straight slot portion; a pivoting portion being substantially a curved slot portion; a slot being closed at each end; a plurality of jaw members; and a rod that is engagable by an actuator and connected to a cam pin.

Additional features and advantages of the gripper assembly will become apparent to those skilled in the art upon consideration of the following detailed description of the illustrated embodiment exemplifying the best mode of carrying out the gripper assembly as presently perceived.

BRIEF DESCRIPTION OF DRAWINGS

The present invention will be described hereafter with reference to the attached drawings which are given as non-limiting examples only, in which:

FIG. 2 is a cross-sectional view of the gripper device of FIG. 1 with the jaws in a closed position;

FIG. 3 is a cross-sectional view of the gripper device of FIG. 1 with the jaws in an open position;

FIG. 4 is a partial cross-sectional view of FIG. 2 taken along plane IV-IV;

FIGS. 9a and 9b are side views of an adjustable gripper tip arrangement;

FIGS. 12a and 12b are schematic views which depict embodiments of cone gripper tips;

FIGS. 13a–13c are schematic views which depict embodiments of receiver point gripper tips;

FIGS. 18a–18d and 19a–19e are schematic views which depict embodiments of reversible gripper tips that have double cone points and double diamond point pads;

FIGS. 20a–20c are schematic views which depict a reversible double-padded gripper tip;

FIGS. 21a and 21b are schematic views which depict a modular fluid activated gripper having upper and lower gripper jaws that can pivot 45° outward from the closed position;

FIG. 26a is a side view of the modular fluid activated gripper. FIG. 26b is a bottom view of the modular fluid activated gripper.

DESCRIPTION OF THE INVENTION

The present invention is directed to fluid pressure actuated grippers of the type employed in automated workpiece handling devices which clampingly grip and transfer a workpiece from one station to another. The gripper devices of the present invention include a pneumatic or hydraulic differential motor which drives a piston rod in a reciprocal fashion, and a pair of jaws which are attached to the piston rod by a mechanical linkage that affects opening and closing of the jaws as the piston rod undergoes reciprocal motion.

The mechanical linkage which connects the gripper jaws to the piston rod and effects opening and closing of the jaws is a pivotal cam type linkage. That is, the gripper jaws include a cam slot which receives a cam pin that is attached to the piston rod. As the piston rod is moved in a reciprocal manner by the pneumatic or hydraulic differential motor, the cam pin slides through the cam slots causing the gripper jaws to open and close. According to the present invention, the cam slots are designed to have a particular shape which affects opening and closing of the gripper jaws, and which further causes the gripper jaws to become locked in either or both a closed position or an open position. "Locked" in position means that the position of the jaws in a closed and/or open position cannot be easily changed except by normal fluid operation of the pneumatic or hydraulic differential motor. As will be better understood from the following description, this "locking" feature prevents the gripper devices from failing in the event that fluid pressure to the pneumatic or hydraulic differential motor becomes interrupted.

The present invention is further directed to fluid pressure actuated grippers which are assembled from a plurality of modular or interchangeable components. For example, the modular grippers of the present invention include a common body having a yoke structure, a common piston assembly which moves in a reciprocal manner in the yoke structure, a cam pin coupled to the piston assembly, and a plurality of interchangeable components which can be assembled to the yoke structure and piston assembly to provide modular fluid pressure activated grippers having diverse performance characteristics. The interchangeable components of the modular grippers include gripper jaws, gripper tips, reversible gripper tips, pneumatic or hydraulic cylinder end closures or plugs, reversible pneumatic or hydraulic cylinder end closures or plugs, and side or impact plates.

Figure 1:
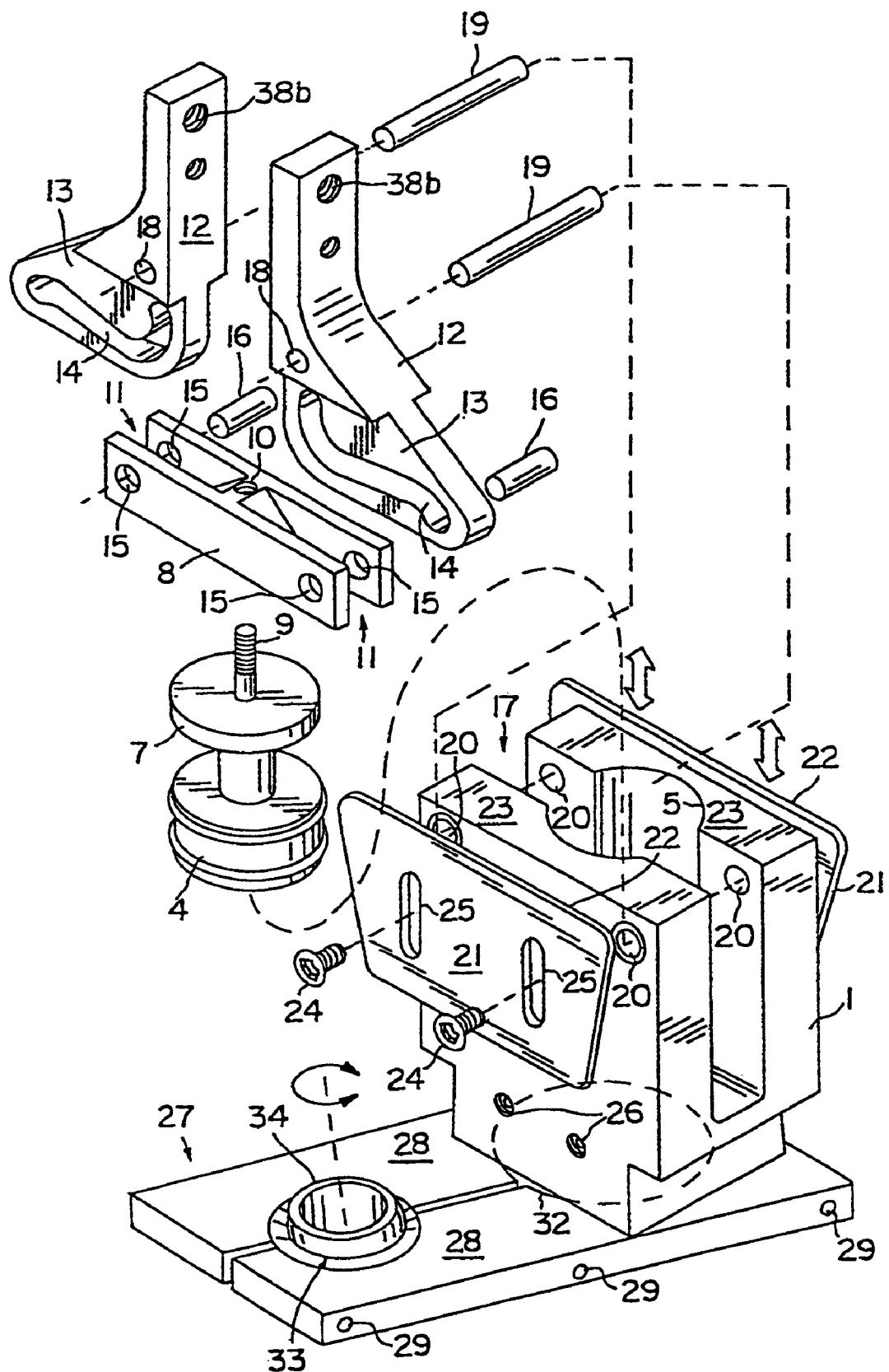
FIG. 1 is an exploded view of a gripper device according to one embodiment of the present invention.
Figure 1A:
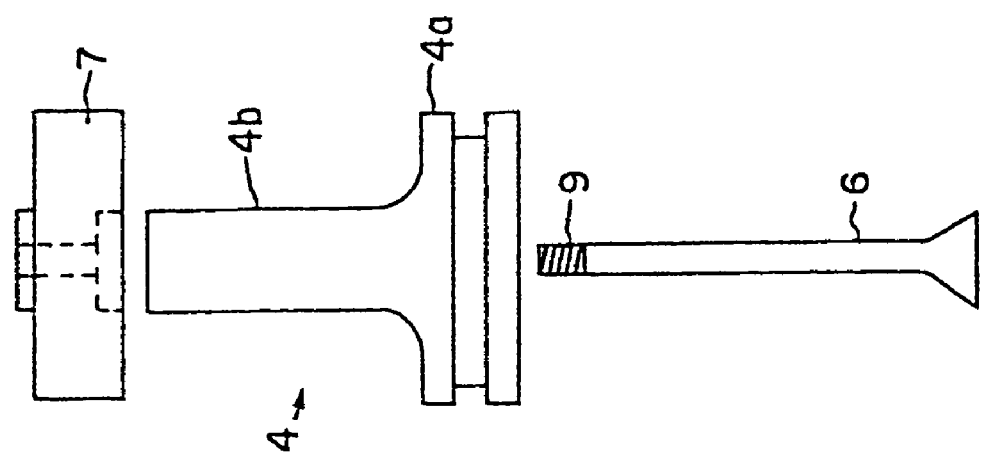
FIG. 1a is an exploded view of the piston assembly of the gripper device of FIG. 1.

FIG. 1 is an exploded view of a gripper device according to one embodiment of the present invention. The gripper device includes a yoke structure 1 which is coupled to a pneumatic or hydraulic differential motor cylinder 2 (FIG. 2). The yoke structure 1 includes a through-bore 3 in the bottom portion thereof for receiving a pneumatic or hydraulic differential motor piston assembly 4 (FIG. 2). The yoke structure 1 further includes a bore 5 for receiving cross piece support plate 7 which is attached to piston assembly 4. Piston assembly 4 is received in pneumatic or hydraulic differential motor cylinder 2 (FIG. 2), in a conventional manner. As shown in FIG. 1a, piston assembly 4 includes a piston 4a and piston shaft 4b attached thereto. Cross piece support plate 7 is received on the end of piston shaft 4b and supports cross piece 8. A threaded screw 6 extends through piston 4a, piston shaft 4b, cross piece support plate 7, and is secured to cross piece 8 by inserting threaded end 9 thereof into threaded bore 10 in cross piece 8.

The cross piece 8 moves within yoke structure 1 as the cross piece support plate 7 moves reciprocally in bore 5, under operation of the pneumatic or hydraulic differential motor. The cross piece 8 includes opposite ends which have cutout central portions 11, as shown, for receiving gripper jaws 12. In this regard, the gripper jaws 12 include stepped or narrow portions 13 which are received in the cutout central portions 11 at the ends of cross piece 8. The narrow portions 13 of the gripper jaws 12 include cam slots 14. The cam slots 14 have a particular shape which affects the opening, closing and locking of the gripper jaws 12, as will be discussed below. The cam slots 14 are symmetrical to one another. Aligned through-bores 15 are provided in the ends of cross piece 8 as shown. These through-bores 15 receive pivot pins 16 which pass through cam slots 14, and link the gripper jaws 12 to the cross piece 8.

As shown in FIG. 1, the upper portion of gripper jaws 12 are approximately as wide as the gap 17 in yoke structure 1. Through-bores 18 are provided in the wide portion of gripper jaws 12. These through-bores 18 receive pivot pins 19 which pivotally connect the gripper jaws 12 to yoke structure 1, so that the gripper jaws 12 can pivot within yoke gap 17. FIG. 1 depicts bores 20 in the yoke structure 1 which receive pivot pins 19. Pivot pins 19 can be secured in bores 20 in any convenient manner, such as snap rings, cooperating threaded structures, etc.

Also, illustrated in FIG. 1 are adjustable slide plates 21. These plates can be adjustable so that edge 22 thereof extends slightly beyond surface 23 of the yoke structure 1. In operation, there is a tendency for surface 23 of yoke structure 1 to become worn as it repeatedly contacts workpieces. Slide plates 21 can be positioned so that workpieces come into contact with edge 22 thereof, thus preventing wear on surface 23 of yoke structure 1. Slide plates 21 can be adjustably positioned by loosening screws 24 which pass through elongated slots 25 and into threaded bores 26, and are preferably made from a tempered or otherwise hard metal. Slide plates 21 can be easily adjusted and replaced as required.

Also, illustrated in FIG. 1 is a mounting plate 27 for mounting the gripper device to an articulated support or transfer device. Mounting plate 27 includes two plate portions 28 which can be secured together by screws or bolts which extend into threaded bores 29. As shown in FIG. 2, the pneumatic or hydraulic differential motor cylinder 2 of the gripper device is defined by a wall 30 that includes a stepped or narrow portion 31. This narrow portion 31 is cylindrical, as opposed to the overall general rectangular shape of the wall 30. When secured together, mounting plates 28 define an opening 32 which extends around narrow cylindrical portion 31 so that the gripper device freely rotates with respect to the mounting plate 27. Mounting plate 27 also includes an opening 33 which can receive a spherical collar 34 that can be clamped therein in a fixed orientation and used to mount the gripper device to an articulated structure.

FIG. 2 is a cross-sectional view of the gripper device of FIG. 1 with the gripper jaws 12 in a closed position. As depicted, gripper tips 35 and 36 secure a workpiece 37 therebetween. Gripper tip 35 is a serrated point tip and is attached to the gripper jaw 12 by a threaded screw 38*a* which is inserted into threaded bore 38*b* provided in the gripper jaws 12. Threaded screw 38*a* is received into corresponding threaded bore provided in the gripper tip 35. Gripper tip 36 is a cone point tip which is threaded directly into threaded bore 38*b*. The illustrated gripper tips are presented as examples of various other tips which can be used in conjunction with the gripper device.

FIG. 2 depicts one manner in which pneumatic or hydraulic differential motor cylinder 2 can be defined by end walls which are secured, e.g., threaded, into cylinder bore 3.

As illustrated in FIG. 2, piston 4 is urged upward by fluid pressure which is applied to port 39 of pneumatic or hydraulic differential motor cylinder 2. As piston 4 moves upwardly, as depicted in FIG. 2, cam pins 16 connected to cross piece 8 slide through cam slots 14 in gripper jaws 12, causing the gripper jaws 12 to pivot about pivot pins 19. This upward or forward movement of piston 4 causes the gripper jaws 12 to pivot into a closed position.

FIG. 3 is a cross-sectional view of the gripper device of FIG. 1 with the gripper jaws 12 in an open position. As depicted in FIG. 3, piston 4 is urged downward by fluid pressure which is applied to port 40 of pneumatic or hydraulic differential motor cylinder 2. As piston 4 moves downward, as depicted in FIG. 3, cam pins 16 connected to cross piece 8 slide through cam slots 14 in gripper jaws 12, causing the gripper jaws 12 to pivot about pivot pins 19. This downward or rearward movement of piston 4 causes the gripper jaws 12 to pivot into an open position as shown.

FIG. 4 is a partial cross-sectional view of FIG. 2 taken along plane IV-IV. FIG. 4 depicts the manner in which the cross piece 8 is received in gap 17 of yoke structure 1 and how the narrow portions 13 of gripper jaw 12 are received in the cutout portions 11 of the cross piece 8 and pivotally secured therein by cam pins 16.

The embodiment of the gripper device depicted in FIGS. 1-4 is designed to lock in both the closed and open position. This locking function is achieved in part by the particular design or shape of the cam slots 14. That is, the cam slots 14 depicted in FIGS. 2 and 3 include three distinct segments, including two locking segments at either end and a central pivoting segment. When the cam pins 16 are positioned in either of the locking segments at the ends of the cam slots 14, the gripper jaws 12 are locked in corresponding closed or open positions. In these locked positions, the gripper jaws 12 cannot be pivoted about pivot pins 19. For example, as can be seen in FIG. 2, when the piston 4 is moved to its full upward or forward position, cam pins 16 are positioned at one end of the cam slots 14. This segment of the cam slots 14, identified by reference numeral 41, causes the gripper jaws 12 to be locked in their closed position, because the configuration of locking segments 41 prevents the gripping jaws 12 from pivoting about pivot pins 19. As can be seen from FIG. 2, gripper jaws 12 can only pivot about pivot pins 19 when cam pins 16 are moved slightly downward by piston 4. In a similar manner, when cam pins 16 are in locking segments 42 of cam slots 14, as shown in FIG. 3, the gripper jaws 12 cannot be pivoted about pivot pins 19.

As the cam pins 16 move between locking segments 41 and 42 of the cam slots 14, gripping jaws 12 are pivoted between their closed and open positions. Thus, the central cam slot segments between the locking segments are referred here to central pivoting segments 43.

As can be seen, the locking segments 41 and 42 are configured to prevent pivotal movement of the gripping jaws 12 about pivot pins 19. The central pivoting segment 43, on the other hand, generally has a continuous curving shape which can be varied to affect the manner in which the gripping jaws move between their closed and open positions. For example, a portion of the slots having a smaller radius of curvature would cause quicker movement of the gripper jaws than a portion having a larger radius of curvature for a constant piston speed. In addition to affecting the speed or rate at which the gripper jaws move, the curved shape of the cam slots have been varied to effect the amount of torque applied between the gripper jaws. Thus, it is to be understood that the shape of the central pivoting segments 43 of the cam slots 14 can be varied as desired.

Figure 5A:
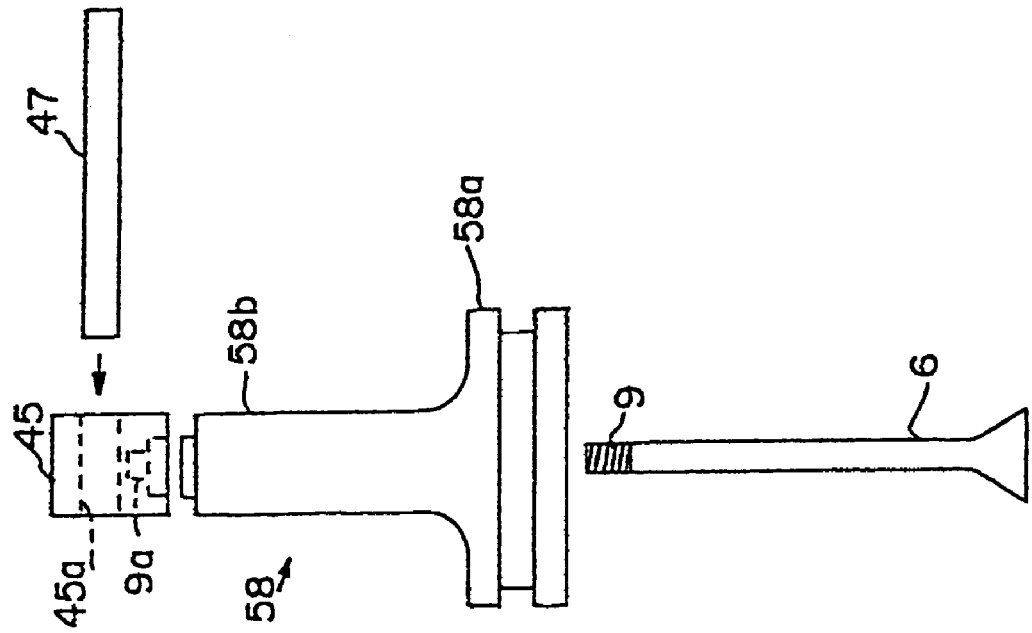
FIG. 5a is an exploded view of the piston assembly of the gripper device of FIG. 5.
Figure 5:
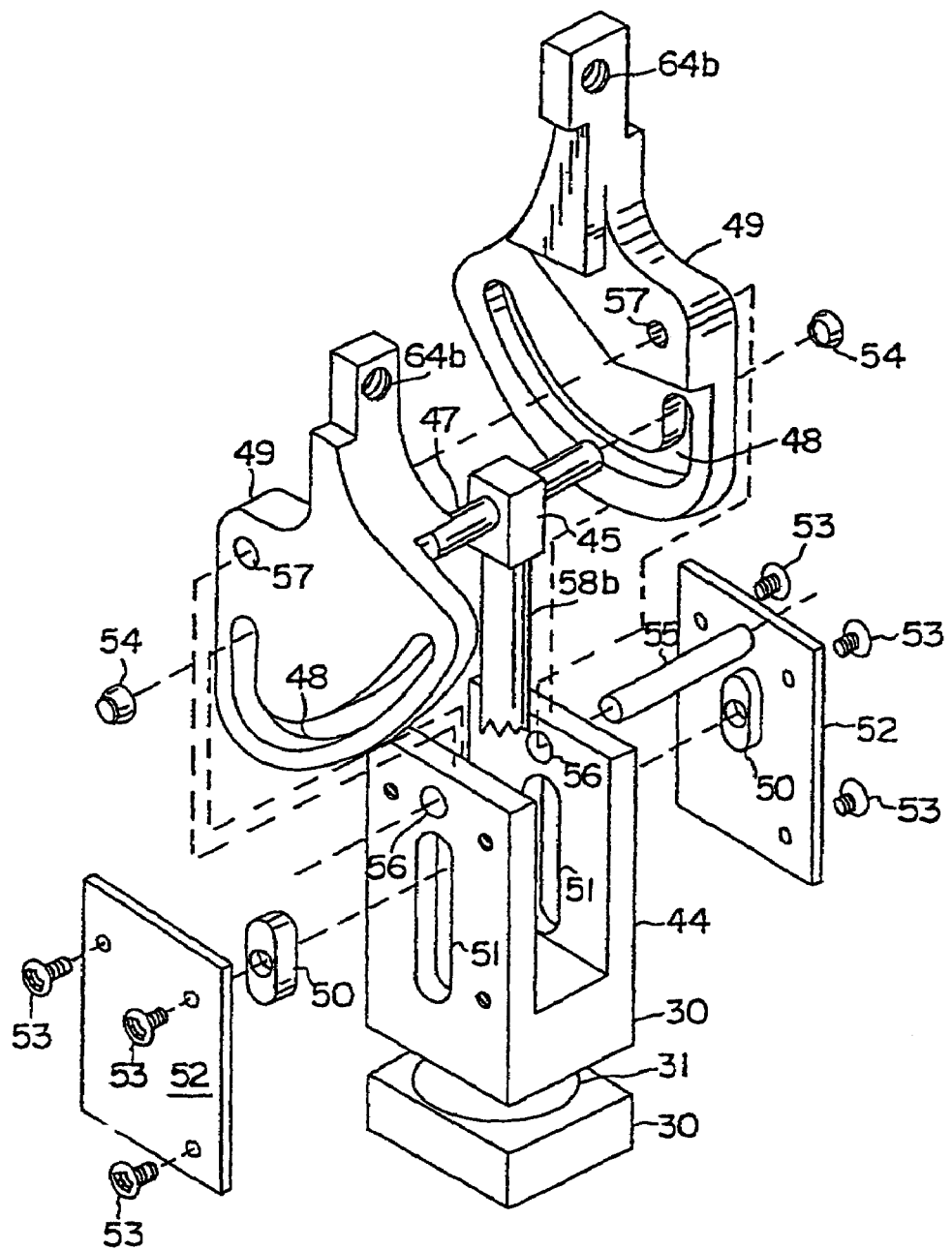
FIG. 5 is an exploded view of a gripper device according to another embodiment of the present invention.

FIG. 5 is an exploded view of a gripper device according to another embodiment of the present invention. The gripper device depicted in FIG. 5 can be used with the mounting plate 27 shown in FIG. 1. However, since the mounting plate 27 is not shown in FIG. 5, the narrow cylindrical portion 31 of the pneumatic or hydraulic motor wall 30 can be seen in perspective.

The gripper device of FIG. 5 includes a yoke structure 44 and a piston assembly 58 which moves in a reciprocal manner in the yoke structure 44. Movement of the piston assembly 58 is affected by a pneumatic or hydraulic motor having a cylinder 46 which is formed in the lower portion of the yoke structure 44 (see FIG. 6). Rather than have a cross piece as in the gripper device of FIG. 1, the gripper device of FIG. 5 includes a single cam pin 47 that is attached to supporting cross piece 45, which in turn is attached to the free end of the piston assembly 58. As shown in FIG. 5a, the piston assembly 58 includes a piston 58a and a piston shaft 58b. Supporting cross piece 45 is attached to the end of piston shaft 58b by a threaded screw 6 having a threaded end 9 which is received in a correspondingly threaded bore 9a in supporting cross piece 45. Supporting cross piece 45 includes a through-bore 45a which receives cam pin 47 as depicted. The cam pin 47 passes through cam slots 48 in gripper jaws 49, and the ends of the cam pin 47 are received in bushings 50 which slide freely in a pair of longitudinal slots 51 in the side walls of the yoke structure 44. It is noted that the bushings have flat parallel sides which slide along the inner surfaces of longitudinal slots 51. These flat sides avoid a point contact and allow for the body or yoke structure to be made of a softer material such as an aluminum alloy. The bushings 50 are held in place in the longitudinal slots 51 between the gripper jaws 49 and side plates 52. Side plates 52 can be attached to the yoke structure 44 by mechanical fastener means, such as screws 53. Spherical surfaced bearings 54 are provided on the ends of cam pin 47 to ensure free movement of the cam pin 47 in cam slots 48.

Gripper jaws 49 are pivotally connected to the yoke structure 44 by means of a pivot pin 55 which passes through aligned through-bores 56 in the side walls of the yoke structure 44 and through-bores 57 in the gripper jaws 49.

FIG. 5 also depicts end closure 60 for pneumatic or hydraulic cylinder 46.

Figure 6:
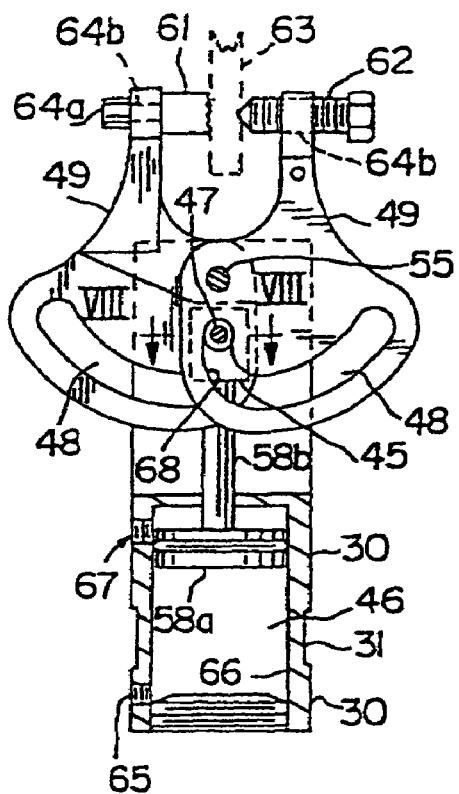
FIG. 6 is a cross-sectional view of the gripper device of FIG. 5 with the jaws in a closed position.

FIG. 6 is a cross-sectional view of the gripper device of FIG. 5 with the gripper jaws in a closed position. As depicted, gripper tips 61 and 62 secure a workpiece 63 therebetween. Gripper tip 61 is a serrated point tip and is attached to the gripper jaw 49 by threaded screw 64a which are inserted into threaded bore 64b provided in the gripper jaws 49. Threaded screw is received into corresponding threaded bore provided in gripper tip 61. Gripper tip 62 is a cone point tip and can be directly threaded into threaded bore 64b. The illustrated gripper tips are presented as examples of various other tips which can be used in conjunction with the gripper device.

FIG. 6 depicts one manner in which pneumatic or hydraulic differential motor cylinder 46 can be defined by a bore 66 formed in the bottom of the yoke structure 44 which has an end wall or plug 60 secured, e.g., threaded, in the end of bore 66.

As illustrated in FIG. 6, piston 58 is urged upward by fluid pressure which is applied to port 65 of pneumatic or hydraulic differential motor cylinder 46. As piston 58 moves upwardly, as depicted in FIG. 6, cam pin 47 connected to supporting cross piece 45 slides through cam slots 48 in gripper jaws 49, causing the gripper jaws 49 to pivot about pivot pin 55. This upward or forward movement of piston 58 causes the gripper jaws 49 to pivot into a closed position.

Figure 7:
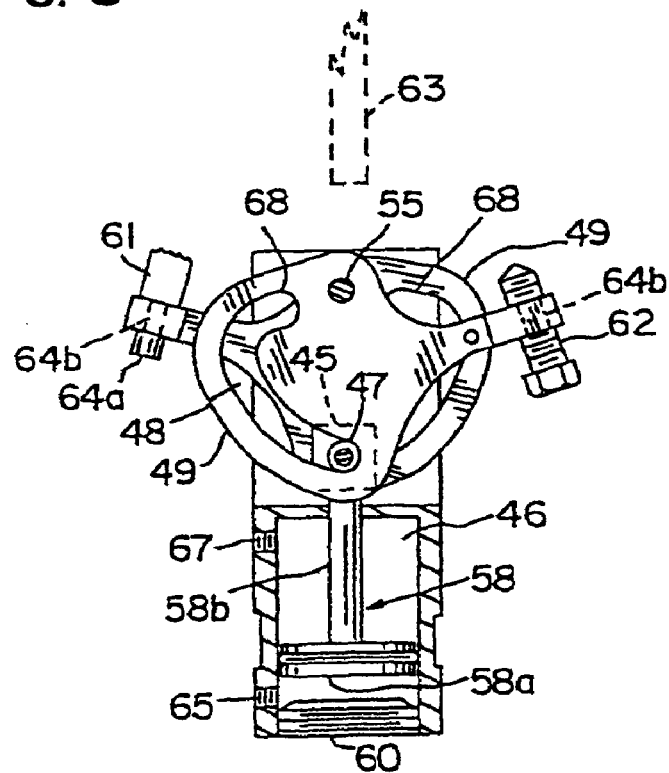
FIG. 7 is a cross-sectional view of the gripper device of FIG. 5 with the jaws in an open position.

FIG. 7 is a cross-sectional view of the gripper device of FIG. 5 with the gripper jaws 49 in an open position. As depicted in FIG. 7, piston 58 is urged downward by fluid pressure which is applied to port 67 of pneumatic or hydraulic differential motor cylinder 46. As piston 58 moves downward, as depicted in FIG. 7, cam pin 47 connected to supporting cross piece 45 slides through cam slots 48 in gripper jaws 49, causing the gripper jaws 49 to pivot about pivot pins 55. This downward or rearward movement of piston 58 causes the gripper jaws 49 to pivot into an open position as shown.

Figure 8:
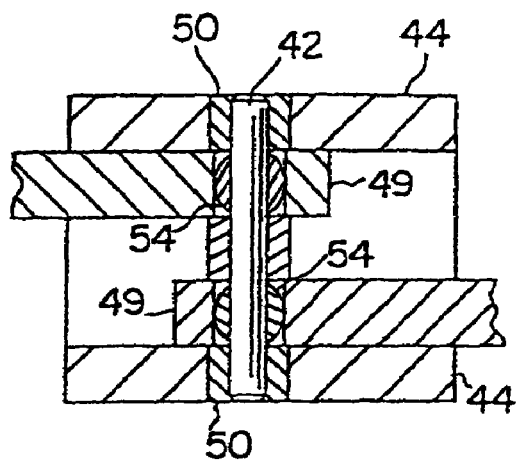
FIG. 8 is a partial cross-sectional view of FIG. 6 taken along plane VIII—VIII.

FIG. 8 is a partial cross-sectional view of FIG. 6 taken along plane VIII-VIII. FIG. 8 depicts the manner in which the bearings 54 mounted on the ends of the cam pin 47 are positioned in the cam slots 48 of the gripper jaws 49, and how the cam pin 47 extends into bushings 50 which are located in longitudinal slots 51. Side plates 52 are not shown in FIG. 8.

The embodiment of the gripper device depicted in FIGS. 5-8 is designed to lock only in the closed position. This locking function is achieved by providing the cam slots 48 with locking segments at one end and pivoting segments throughout the remaining portion thereof. When the cam pin 47 is positioned in the locking segments of the cam slots 48, the gripper jaws 49 are locked in a closed position as shown in FIG. 6. In this locked position, the gripper jaws 49 cannot be pivoted about pivot pin 55. That is, as can be seen in FIG. 6, when the piston 58 is moved to its full upward or forward position, cam pin 47 is positioned at one end of the cam slots 48. These segments of the cam slots 48, identified by reference numeral 68, cause the gripper jaws 49 to be locked in their closed position, because the configuration of locking segments 49 prevents the gripping jaws 49 from pivoting about pivot pin 55. As can be seen from FIG. 6, gripper jaws 49 can only pivot about pivot pin 55 when cam pin 47 is moved slightly downward by piston 58.

In contrast, when cam pin 47 is in opposite ends of cam slots 48 as shown in FIG. 7, the gripper jaws 49 can be pivoted about pivot pin 55, because at this opposite end of the cam slots 48 the slots have a curvature which allows the gripper jaws 49 to pivot about pivot pin 55. As the cam pin 47 moves between locking segments 68 and the opposite ends of the cam slots 48, gripping jaws 49 are pivoted between their closed and open positions. As can be seen, the locking segments 68 are configured to prevent pivotal movement of the gripping jaws 49 about pivot pin 55. On the other hand, the remaining portion or segment of the cam slots 48 have a continuous curving shape which can be varied to affect the manner in which the gripping jaws move between their closed and open positions. For example, a portion having a smaller radius of curvature would cause quicker movement of the gripper jaws than a portion having a larger radius of curvature for a constant piston speed. Thus, it is to be understood that the shape of the curved segments of the cam slots 48 can be varied as desired.

FIGS. 9a and 9b are side views of an adjustable gripper tip arrangement. As depicted in FIGS. 9a and 9b, the facing ends of the gripper jaws 70 (one shown) have a concave radial surface 71 which mates with a corresponding convex radial surface 72 on the gripper tip 73, e.g., a serrated tip or threaded stud. These mating radial surfaces allow the gripper tip 73 to be rotated at installation so that they are perpendicular to a workpiece surface. In this regard, the gripper jaws 70 will close at slightly different angles depending on the thickness of a workpiece. For example, FIG. 9a depicts a gripper jaw 70 which is 2.00° off parallel (open) from the surface or central axis of a workpiece which is 0.242 inch (6.147 mm.) thick. FIG. 9b depicts a gripper jaw 70 which is parallel with the surface or central axis of a workpiece which is 0.094 inch (2.388 mm) thick. In each case, the gripper tip 73 is perpendicular to the surface or central axis of the workpiece. The gripper tips 73 are adjusted to a particular workpiece thickness, by loosening bolt 74 which attaches the gripper tips 73 to the gripper jaws 70, and moving the gripper jaws 70 to a closed position on a workpiece. In this position, the gripper tips 73 are rotated against the concave surface 71 of the face of the gripper jaws 71 until the gripper tips 73 are perpendicular to the surface or central axis of the workpiece. Bolts 74 are then tightened to secure the gripper tips 73 in position.

In FIGS. 10-26d common reference numbers have been used to identify similar elements wherever possible for convenience.

Figure 10:
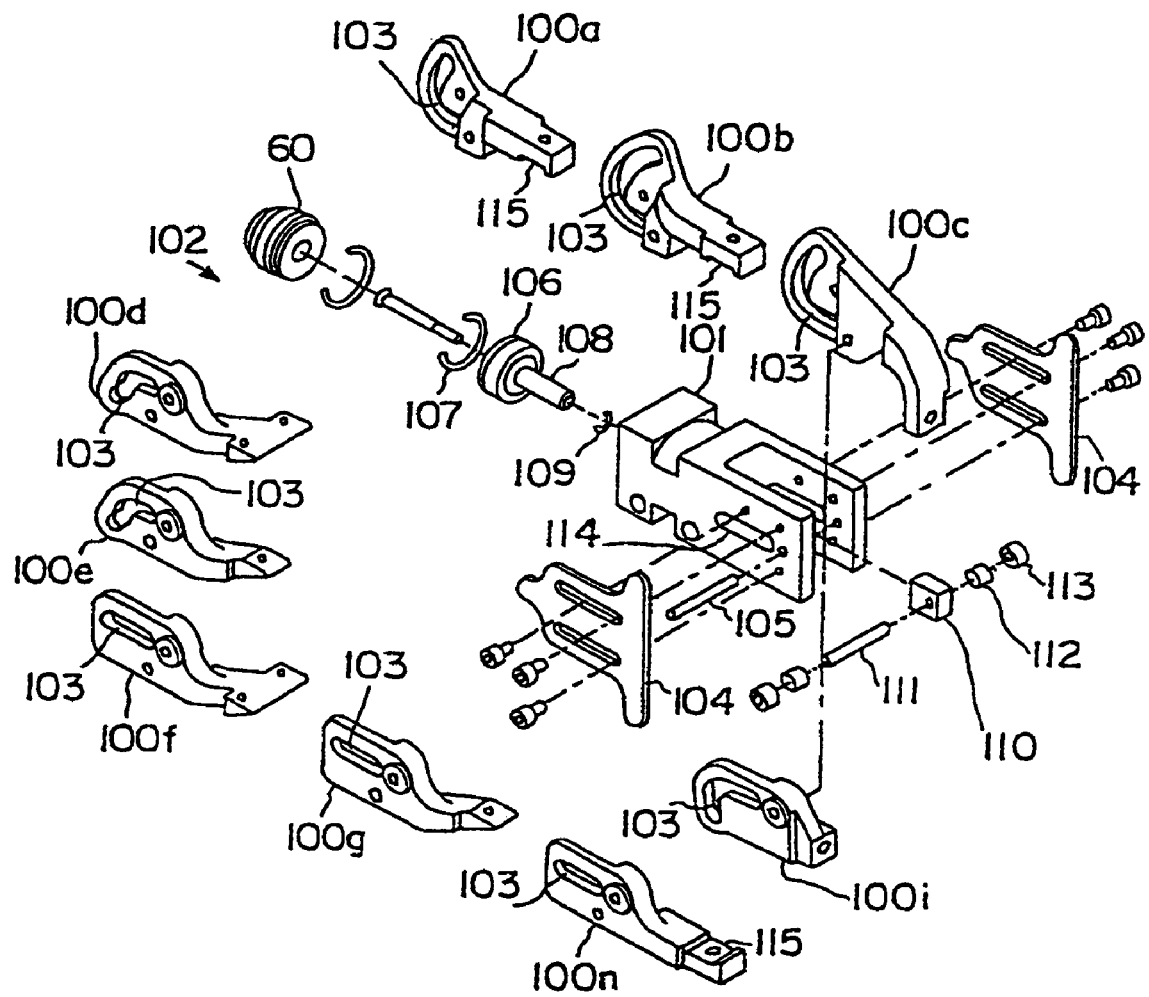
FIG. 10 is an exploded prospective view which depicts components of a modular gripper according to the present invention.

FIG. 10 is an exploded view which depicts the components of a modular gripper according to the present invention. The "common elements" of this gripper include the body 101, the piston assembly 102, jaw pivot pin 105, and the jaw driver assembly. The piston assembly 102 includes piston 106, piston seal 107, piston shaft 108, and piston shaft seal 109. The jaw driver assembly includes cross piece 110 which is attached to piston shaft 108, cam pin 111 which is coupled to cross piece 110, and jaw bushings 112 which are received in cam slots 103 of the jaw members 100 and slider bushings 113 which are received in longitudinal slots 114 formed in the side walls of the yoke structure of the body 101.

The term "common elements" referred to above is used to identify the basic elements of a modular gripper to which numerous interchangeable parts or elements can be attached or assembled. The "common elements" include the gripper body and the mechanical elements which are used to drive the gripper jaws.

FIG. 10 depicts a number of different interchangeable gripper jaws 100a to 100i which can be assembled in the body 101 and coupled to the jaw driver assembly 102. As depicted, each of the different jaws 100a to 100i have different tip end designs and/or cam slots 103 that effect different movement characteristics. As depicted in FIG. 10 and discussed in more detail below, the modular gripper of the present invention can be assembled to include gripper jaws having different tip designs that can be used for handling, e.g., transporting or transferring, different types of workpieces. Also, as discussed below, the modular gripper can be assembled with gripper jaws 100 having different cam slot 103 configurations which can affect the angle at which one or both jaws open or close, and which determine whether or not the jaws lock in an open and/or closed position.

Jaw 100a includes a recessed tip seat 115 and is designed to open either 22.5° or 45° from a closed position. Jaw 100b includes a recessed tip seat 115 and is designed to open 75° from a closed position. Jaw 100c includes a tip seat which can be recessed and is designed to open 55° from a closed position. Jaw 100d includes a double chisel point and is designed to open 22.5° from a closed position. The chisel point includes threaded bores for receiving a cone point or cone gripper tip discussed below. Jaw 100e is similar to jaw 100d except jaw 100e includes a single chisel point. Jaw 100f includes a double chisel point and is designed to remain stationary. Jaw 100g is similar to jaw 100e except jaw 100g includes a single chisel point. Jaw 100h includes a recessed tip seat 115 and is designed to remain stationary. Jaw 100i is a flange jaw and includes a tip seat at the end thereof. Jaw 100i is designed to open 22.5° from a closed position. Jaws 100a–100i are examples of different gripper jaw designs which can be used in various combinations. As will be understood from the following description, the shape and configuration of the slots in the jaws can be varied to affect a desired movement of the jaws, including angular degree of opening and closing, rate of opening and closing and force applied to a workpiece in the closed position. The dimensions depicted throughout the figures are relative and can be scaled up or down as desired.

The side or impact plates 104 depicted in FIG. 10 are both adjustable and interchangeable with other impact plate designs, which are discussed below. In addition, the end closure or plug 60 for the pneumatic or hydraulic cylinder is interchangeable with plugs 60 of different lengths which can be used to limit the travel of the piston assembly and hence the angular movement of the gripper jaws 100.

Figure 11A:
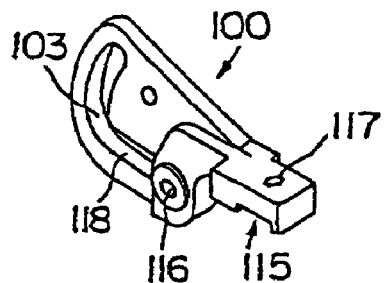
FIGS. 11a–11g are schematic views which depict a pivotal gripper jaw having a recessed tip seat.
Figure 11B:
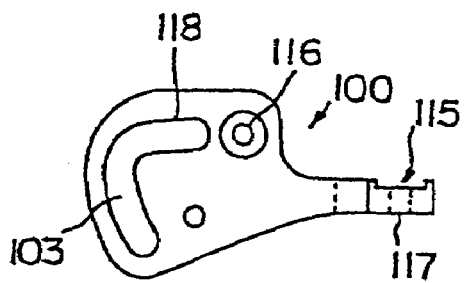
Figure 11C:
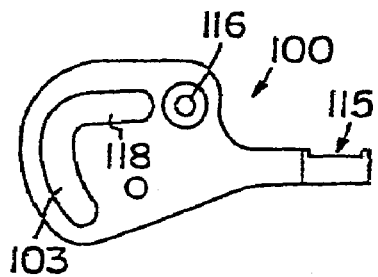
Figure 11D:
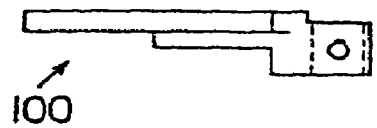
Figure 11E:
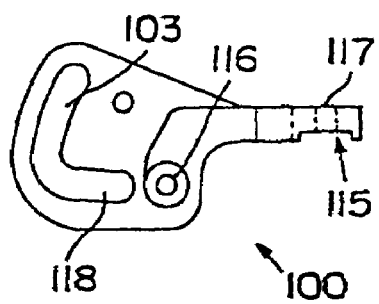
Figure 11F:
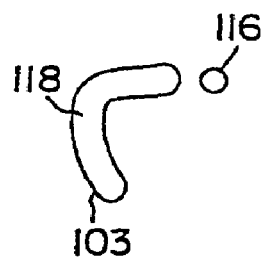

FIGS. 11a–11g depict a pivotal gripper jaw having a recessed tip seat 115. The gripper jaw 100 of FIGS. 11a–11g is designed to pivot 45° outward from the closed position. FIG. 11a is a perspective view of the pivotal gripper jaw 100. FIGS. 11b and 11c are inverted back side views of the pivotal gripper jaw 100. FIG. 11d is a top view of the pivotal gripper jaw 100. FIG. 11e is a front side view of the pivotal gripper jaw 100.

Collectively, FIGS. 11a–11e depict the pivotal gripper jaw 100 as including a through-bore 116 for receiving a pivot pin 105 which connects the gripper jaw 100 to body or yoke structure 101, as discussed above. Cam slot 103 has a generally curved shape with a substantially straight end portion 118 which affects locking of the gripper jaw 100 when the gripper jaw 100 is in its closed position, as discussed above. Through-bore 116 is aligned with the central axis of the substantially straight end portion 118 of cam slot 103. As the pivot pin 105 moves along the curved portion of the cam slot 103, angular movement is imparted to the gripper jaw 100 so that the gripper jaw 100 moves 45° between an open and closed position.

The pivotal gripper jaw 100 of FIGS. 11a–11g includes a gripper tip seat 115. The recessed tip seat 115 includes a threaded bore 117 for receiving a screw which is used to secure a gripper tip within the recessed tip seat 115. The recessed tip seat 117 provides parallel recessed edges which engage opposed edges of a gripper tip, as discussed below, and relieve shear forces which would otherwise, i.e., absent the parallel recessed edges, be applied directed to a screw used to secure a gripper tip to the gripper jaw 100. According to one embodiment, the recessed seat 115 can have a concave curved surface for receiving a gripper tip having a corresponding curved shape as indicated in FIGS. 9a and 9b. This embodiment would allow the gripper tip to be adjusted parallel to the surface of a workpiece.

Figure 11G:
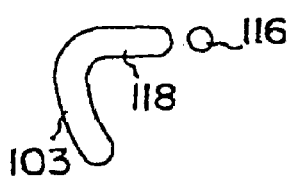

FIGS. 1f and 11g are schematic views of the shape and alignment of the cam slot 103 and through-bore 116. It is to be understood that the angular degree of movement of the pivotal gripper jaw 100 of FIGS. 11a–1g, and other pivotal gripper jaws disclosed herein, can be increased or decreased by appropriately lengthening or shortening cam slot 103. In this regard, the measurements of reference points shown in FIGS. 11a–11g that are used to define the curved shape of the cam slot are merely relative to one particular example. It is to be understood that the dimensions given in FIGS.

11a–11g are relative and can be scaled up or down as desired. It is further to be understood that the cam slot in FIGS. 11a–11g is illustrative only, and that the shape of the cam slots used in the gripper devices of the present invention can vary. Accordingly, FIG. 10 depicts pivotal gripper jaws which move 22.5°, 45°, 55°, and 75°. It is obvious from these examples that pivotal gripper jaws can be designed with a variety of angles of movement.

FIGS. 12a–20c depict different gripper tips which can be used interchangeably with gripper jaws having gripper tip seats, or the flange jaw grippers depicted in FIG. 10.

FIGS. 12a and 12b, are schematic views which depict embodiments of cone gripper tips. FIG. 12a is a side view of a cone gripper tip 121, and FIG. 12b is an end view of the same tip. The cone gripper tip 121 of FIGS. 12a and 12b includes a base 122 which is depicted as having a hexagonal shape, a cylindrical tip 123 which extends from the base 122, and a threaded stud 124 which extends from the base 122 on an opposite side from the cylindrical tip 123. The cylindrical tip 123 terminates at a point 125 which can be defined by any desired angle. The base 122 is depicted as having a hexagonal shape. However, it is to be understood that the base 122 can be of any desired shape such as square, rectangular, round, round with parallel flat sides, etc. The base 122 is used to tighten the threaded stud 124 into a corresponding threaded bore on the tips of a gripper jaw. Accordingly, the periphery of the base 122 should include surfaces which can be easily gripped with a wrench for tightening purposes. The cylindrical shape of the tip 123 is a matter of convenience. This tip 123 can have any cross sectional shape such as square, rectangular, oval, etc.

FIGS. 13a–13c are schematic views which depict embodiments of cone point gripper tips which are designed to receive tip elements. FIG. 13a is a side view of a cone point gripper tip, and FIGS. 13b and 13c are front and end views of the same tip. The cone gripper tip 121' of FIGS. 13a–13c includes a base 122 which is depicted as having a hexagonal shape, and a threaded stud 124 which extends from one side of the base 122. The base 122 has a tip receiver end 123' defined by a tapered portion which terminates at an internal bore 126. This bore 126 is designed to be used with the cone point 121 shown in FIGS. 12a–12b. The bore 126 allows a workpiece being gripped between the cone point 121' of FIGS. 13a–13c and the cone point 121 of FIGS. 12a–12b to be bent away from the point 125 causing a cavity in the workpiece that improves the gripper's ability to hold the workpiece. The base, 122 is depicted as having a hexagonal shape. However, it is to be understood that the base 122 can be of any desired shape such as square, rectangular, round, round with parallel flat sides, etc. The base 122 is used to tighten the threaded stud 124 into a corresponding threaded bore on the tips of a gripper jaw. Accordingly, the periphery of the base 122 should include surfaces which can be easily gripped with a wrench for tightening purposes. It is noted that the length of the cone gripper tips and the receiver point gripper tips can vary as desired to achieve any necessary clearance.

Figure 14B:
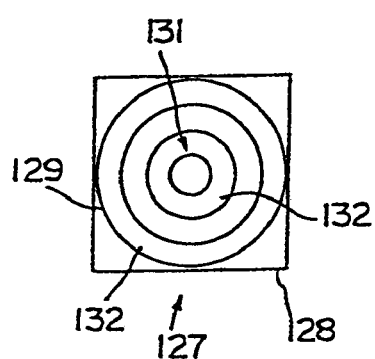
FIGS. 14a, 14b, 15a and 15b are schematic views which depict embodiments of padded gripper tips.
Figure 14A:
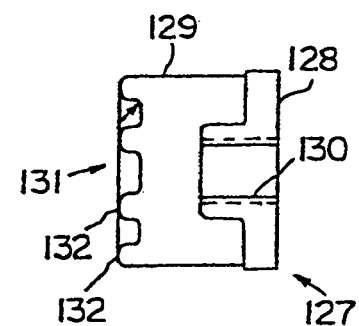

FIGS. 14a, 14b, 15a and 15b are schematic views which depict embodiments of padded gripper tips. FIG. 14a is a side view of a gripper tip 127 and FIG. 14b is an end view of the same tip. The padded gripper tip 127 of FIGS. 14a and 14b includes a base 128 which is depicted as having a square shape, and a pad portion 129 which is bonded to the base 128 and depicted as having a cylindrical shape. The base 128 includes an internally threaded bore 130 by which the padded gripper tip 127 can be attached to the end of a gripper jaw by passing a threaded member though the end of the jaw and into threaded bore 130. Alternatively, the base 128 could be provided with a threaded stud similar to that depicted in FIGS. 12–13.

The pad portion 129 can be bonded to the base 128 by any suitable chemical means such as adhesives, epoxies, thermal bonding or welding, etc. In addition, the padded portion 129 can be mechanically secured to the base 128. For example, the portion of the base 128 which extends into the pad portion 129, as depicted, could include external threads, bayonet mounting structure, securing projections, etc. by which the pad portion 129 could be secured to the base 128.

Neither the base 128 nor the pad portion 129 is limited to the shapes depicted in FIGS. 14a and 14b. That is, the base 128 and pad portion 129 can have any suitable cross sectional shape, including round, triangular, square, hexagonal, oval, etc. The face 131 of the pad portion 129 is provided with an uneven, or grooved surface to increase gripping friction. As depicted, the face 131 of the pad portion 129 is provided with a series of concentric grooves or ribs 132. Other uneven or grooved or ribbed surface patterns can be used including any combination of linear and/or curved grooves or ribs, patterns of protrusions or indentations, or random surface structures.

As in the case of all the non-padded gripper tips, the base 128 is made from a sturdy wear- and impact-resistant material such as a metal. The pad portion 129 can be made out of any suitable plastic, resinous, or polymeric material such as urethane.

Figure 15B:
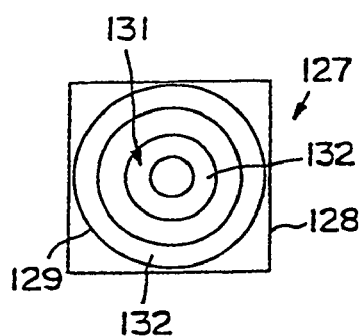
Figure 15A:
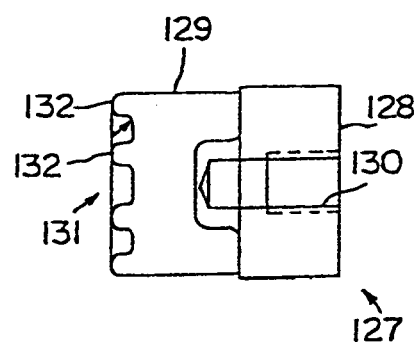

FIG. 15a is a side view of a padded gripper tip and FIG. 15b is a front view of the same tip. The padded gripper tip 127 of FIGS. 15a and 15b differ from the padded gripper tip 127 of FIGS. 14a and 14b in the length of the base 128. From these drawings it can be understood that the base 128 can be any suitable length.

Figure 16A:
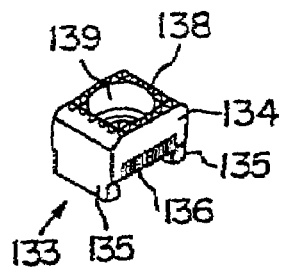
FIGS. 16a–16d and 17a–17d are schematic views which depict embodiments of diamond point pad gripper tips.
Figure 16B:
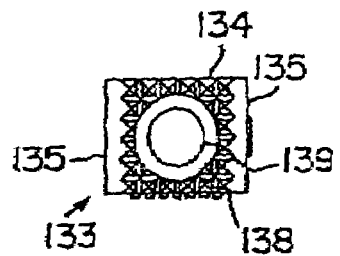
Figure 16C:
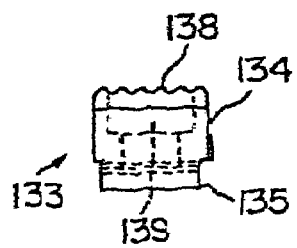
Figure 16D:
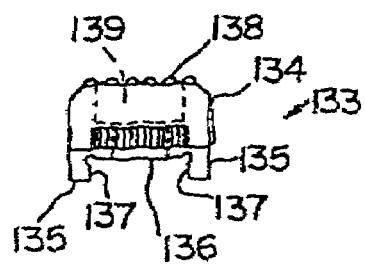

FIGS. 16a–16d, and 17a–17d are schematic views which depict embodiments of diamond point pad gripper tips. FIG. 16a is a prospective view of a diamond point pad gripper tip 133. FIG. 16b is a top or face view thereof. FIG. 16c is an end view thereof. FIG. 16d is a side view of the same tip. The diamond point pad gripper tip 133 of FIGS. 16a–16d includes a substantially rectangular body 134 having opposed sides 135 which extend beyond a lower surface 136 thereof so as to define a saddle-like structure. This saddle-like structure is designed to be received in and mate with the recessed or stepped structure of the gripper tip seats 115 depicted in FIGS. 10 and 11. The extended portions of the sides 135 restrict linear movement of the diamond point pad gripper tip 133 in one direction and the edges of the recessed or stepped portion of the gripper tip seat 115 restrict linear motion in an orthogonal direction. As depicted, the junction between the lower surface 136 of the body and the inner surfaces 137 of the extended side portions 135 may include a recessed area rather than a 90° angle in order to accommodate any burs, dents, or other imperfections on the corresponding mating portion of the gripper tip seat structure 115.

The face 138 of the diamond point pad gripper tip 133 is formed with a matrix of protrusions which can be cast or machined into the surface during manufacture. Opposed edges of the face 138 can be beveled as depicted in FIG. 16b. A stepped through-bore 139 is provided in the face 138 of the diamond point gripper tip 133 as depicted. The stepped bore 139 has a larger diameter portion at the surface of face 138 which allows a threaded member used to secure the tip 133 to a gripper jaw to be counter sunk in the bore 139.

Figure 17A:
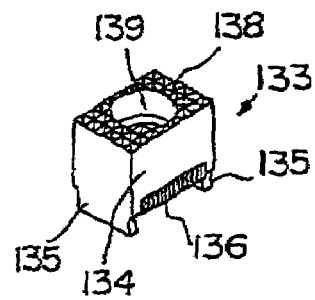
Figure 17B:
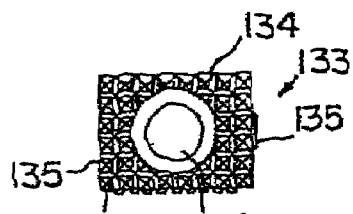
Figure 17C:
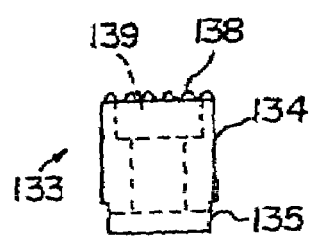

FIG. 17a is a perspective view of a diamond point pad gripper tip 133. FIG. 17b is a top or face view thereof. FIG.

Figure 17D:
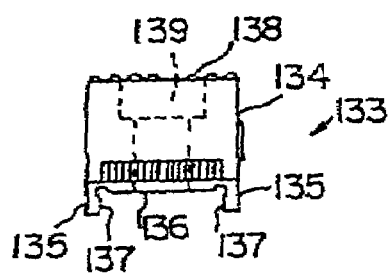

17c is an end view thereof. FIG. 17d is a side view of the same tip. The diamond point pad gripper tip 133 of FIGS. 17a–17d differs from the diamond point pad gripper tip 133 of FIGS. 16a–16d in the height of the body 134. From these drawings it can be understood that the body 134 can have any suitable height.

FIGS. 18a–18d and 19a–19e depict reversible gripper tips 140 which have double cone points 141 and double diamond point pads 142. FIG. 18a is a perspective view of a reversible gripper tip 140. FIG. 18b is a top of view thereof FIG. 18c is cross sectional view taken along C—C in FIG. 18d. FIG. 18d is a front view of the reversible gripper tip 140.

The reversible gripper tip 140 of FIGS. 18a–18d includes a central body portion 143 which extends between two reversible tip ends 144. Each of the reversible tip ends 144 includes opposed gripping surfaces. In the example shown in FIGS. 18a–18d, the reversible tip ends 144 include a double cone point on one face 141 and a double diamond point pad on the opposing face 142. The central body portion 143 includes a through-bore 145 by which the reversible tip 140 can be secured in the recessed or stepped portion of a gripper tip seat 115. The manner in which the reversible tips 144 extend beyond the upper and lower surface of the central body portion 143 provides saddle-like structures which can mate with the recess or stepped portion of a gripper tip seat 115, as discussed above.

As depicted, the junctions between both the upper and lower surfaces of the central body portion 143 and the inner surfaces of the reversible tips 144 may include a recessed area rather than a 90° angle in order to accommodate any burs, dents, or other imperfections on the corresponding mating portion of the gripper tip seat structure. The structure of the double cone points 141 and the double diamond point pad 142 are similar to the corresponding structures on the non-reversible tips discussed above.

FIG. 19a is a perspective view of a reversible gripper tip 140. FIG. 19b is a top of view thereof. FIG. 19c is an end view thereof. FIG. 19d is a front view of the reversible gripper tip 140. The reversible gripper tip 140 of FIGS. 19a–19e is similar to that of FIGS. 18a–18d except that the reversible gripper tip 140 of FIGS. 19a–19e includes bores 146 in the double diamond point pads 142.

It is noted that the height of the reversible tips 144 and the attachment position of each to the central body portion 143 can be modified to affect the "height" of each of the opposed gripping face structures as desired. It is also noted that the double diamond point pad gripping faces can include a bore 146 or a structure defining a conical region (see FIGS. 18a–18d) which will enhance gripping of a workpiece.

FIGS. 20a–20c are schematic views which depict a reversible double-padded gripper tip 150. FIG. 20a is a cross-sectional side view of the reversible double-padded gripper tip 150. FIG. 20b is a top view thereof. FIG. 20c is a bottom view thereof. The reversible double-padded gripper tip 150 includes a central body portion 151 and opposed tip members 152 which extend orthogonally to the central body portion 151 at either end thereof. According to one embodiment, as shown, the central body portion 151 includes through-bores members 153 near opposite ends thereof through which the opposed tip 152 extend. The central body portion 151 further includes a central through-bore 154 through which a threaded member can be used to secure the reversible double-padded gripper tip 150 to a gripper tip seat 115. The embodiment of the double-padded gripper 150 tip depicts how the tip members 152 can be shaped to provide wider or narrower gripping pads on opposite sides of the central body portion 151. In an alternate embodiment, the height of the tip members 152 and the attachment position of each to the central body portion 151 can be modified to affect the "height" of each of the gripping faces of the tip members 152, as desired.

For the reversible double-padded gripper tip 150, the central body portion 151 can be made from a sturdy wear and impact resistant material such as a metal, and the tip members 152 can be made out of any suitable plastic, resinous, or polymeric material such as urethane.

FIGS. 21a and 21b are schematic views which depict an example of a modular fluid activated gripper that has upper and lower gripper jaws 100a which can pivot 45° outward from the closed position. FIG. 21a is a side view of the modular fluid actuated gripper which depicts the upper and lower gripper jaws 100a in their closed position. The open position of the gripper jaws 100a is depicted in phantom. Each of the gripper jaws includes a gripper tip seat 115. FIG. 21b is a bottom view of the modular fluid actuated gripper of FIG. 21a. It is also pointed out that FIGS. 21 and 26 illustrate the use of side or impact plates 104 that have different shapes. More particularly, the side or impact plates have impact surfaces which extend outward at the side or sides of the gripper where pivotal gripper jaws are used since the gripper can be moved towards a workpiece until the leading edge of the impact plates contact the workpiece, proper adjustment of the impact plates may need to be made to ensure alignment and position of the workpiece in the jaws of the gripper. As seen in the drawings, these extended impact surfaces are not required for stationary gripper jaws.

Figure 22B:
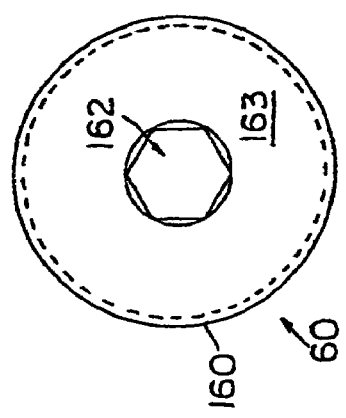
FIGS. 22a and 22b are schematic views which depict a threaded plug that is designed to be inserted into bottom of the pneumatic or hydraulic cylinder.
Figure 22A:
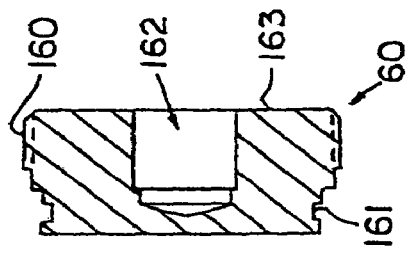

FIGS. 22a–22b and 23a–23c are schematic views which depict embodiments of the end closure or plug 60 that is illustrated in FIG. 5. FIGS. 22a and 22b depict a threaded plug 60 which is designed to be inserted into bottom of the pneumatic or hydraulic cylinder 46. FIG. 22a is a cross-sectional view of the plug 60 and FIG. 22b is an end view thereof. The plug 60 includes a threaded portion 160 by which it is secured into a corresponding bore in the bottom of the pneumatic or hydraulic cylinder 46. A groove 161 is provided on the periphery of the plug 60 and used to secure an o-ring or similar sealing gasket. In order to tighten plug 60 in the bottom of the pneumatic or hydraulic cylinder 46, a keyed bore or tightening tool receiving structure 162 is provided in the bottom 163 of the plug 60. This keyed bore 162 can have any convenient shape which allows it to receive a tightening tool, such as hexagonal for receiving an allen wrench, a groove for receiving a screw driver, or any similar shape.

The length of the plug 60, when inserted in the bottom of the pneumatic or hydraulic cylinder, can limit the distance the piston assembly moves, and thus the angle at which pivotal gripper jaws open. Therefore, according to the present invention, a variety of plug lengths can by used interchangeably to control the angle at which pivotal gripper jaws open. According to one embodiment, a threaded plug 60 can be used with indicia corresponding to the depth at which it is threaded into the bottom of the cylinder. The position or depth of this plug 60 could be adjusted, using the indicia as a reference, to limit the distance the piston assembly moves. It is also possible to use a locking element, e.g., threaded ring or nut, to keep the position of the plug 60 fixed.

Figure 23C:
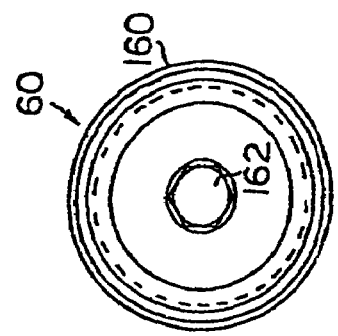
FIGS. 23a–23c are schematic views which depict a reversible-threaded plug that is designed to be inserted into bottom of the pneumatic or hydraulic cylinder.
Figure 23A:
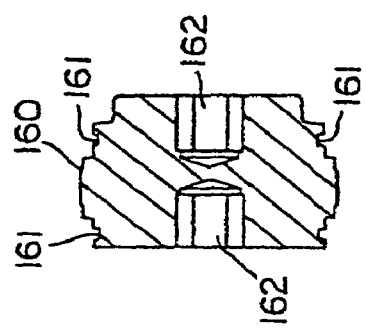
Figure 23B:
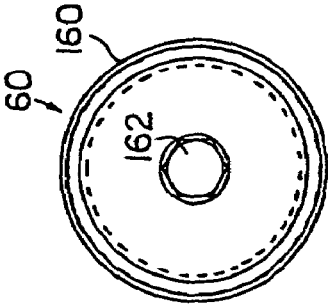

The closure or plug of FIGS. 23a–23c is reversible and has two different lengths or depths which can be used to limit the distance the piston assembly moves in the cylinder. FIG. 23a is a cross-sectional view of the plug 60'. FIGS. 23b and 23c are opposite end views thereof. The reversible plug 60' has an externally threaded center portion 160 with grooves 161 adjacent either side of the central threaded portion 160. These grooves 161 are provided to receive o-rings or other similar sealing members. Each end of the reversible plug 60' has a keyed bore or tightening tool receiving structure 162, as discussed, with reference to FIGS. 22a–22b. As depicted in FIG. 23a, the central threaded portion 160 is actually offset from the center of the length of the plug 60' so that the distance from the threaded portion 160 to either end of the plug 60' is different. This provides a plug 60' that has two different lengths or depths when inserted and secured into a bore at the bottom of the pneumatic or hydraulic cylinder. Reversing the plug 60' allows selection between the two lengths or depths, and thus adjustment of the angle at which a pivotal gripper jaw moves.

Figure 24A:
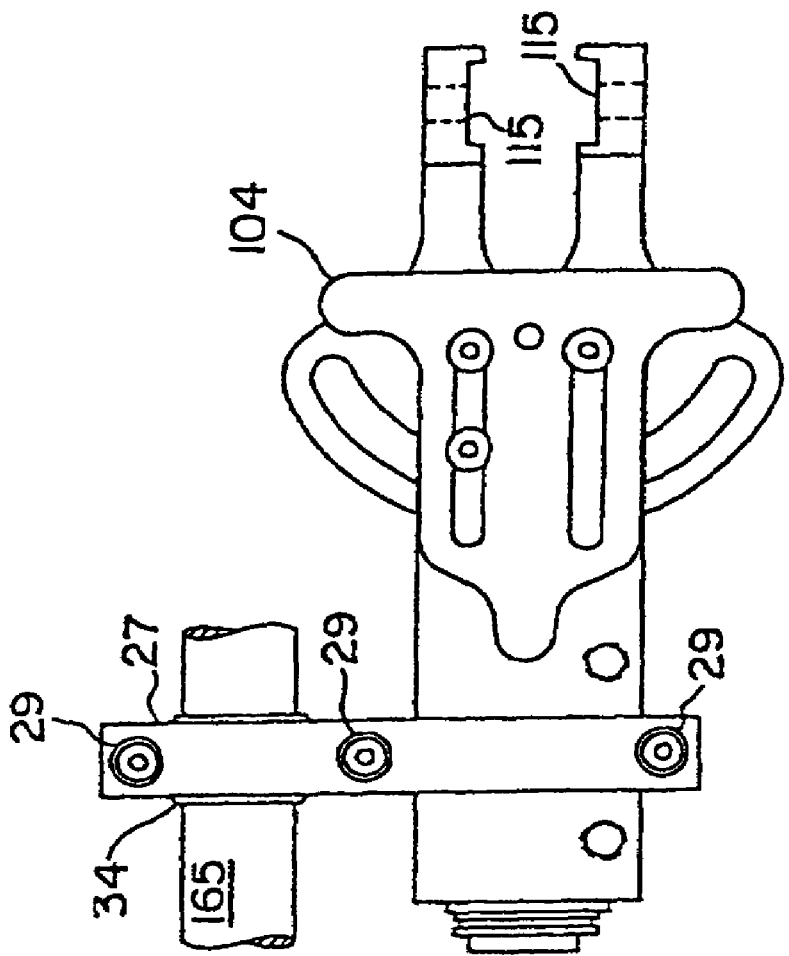
FIGS. 24a and 24b are schematic views which depict a modular gripper secured in a mounting plate.
Figure 24B:
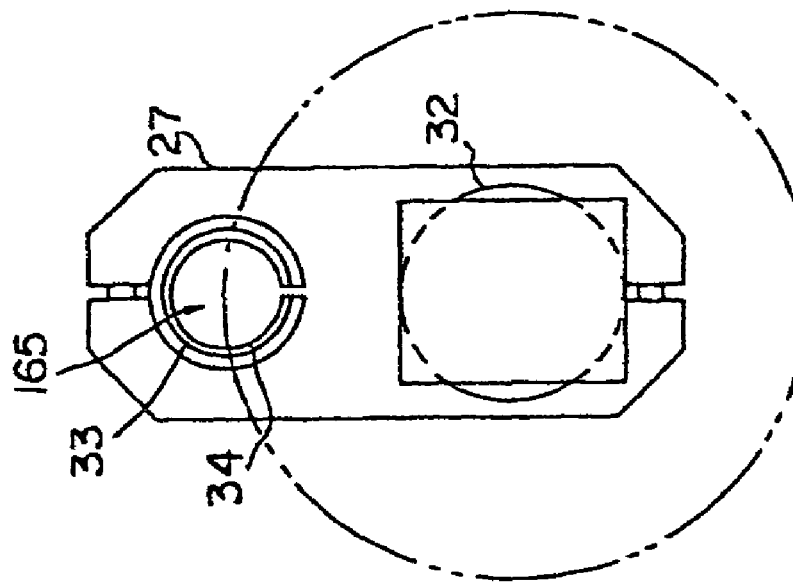

FIGS. 24a and 24b depict a modular gripper secured in a mounting plate 27. FIG. 24a is a side view of the assembly, and FIG. 24b is an end view of the assembly. As discussed above in reference to FIG. 1, plate 27 includes an opening 33 which can receive a spherical collar 34 that can be clamped therein in a fixed orientation and used to mount the gripper device to an articulated structure. The spherical collar 34 receives a support 165, as depicted in FIG. 24a, allows the mounting plate 27 and modular gripper attached thereto, to be adjusted over an angular range defined between the support 165 and mounting plate 27 by rotating the spherical collar 34 in opening 33.

As depicted in FIG. 24b, the modular gripper can be adjusted 360° by rotation thereof in opening 32. These adjustments allow the modular gripper to be positioned at virtually any angle with respect to support 165.

The range of angular adjustment between the support 165 and mounting plate 27 which is affected by rotating the spherical collar in opening 33 is dependent on the spherical shape of the spherical collar and clearance between the support and mounting plate. Angular ranges of 30° off center are easily provided, however, larger ranges are possible.

As discussed above, the mounting plate 27 includes two halves which are secured together by screws or bolts which extend into threaded bores 29. The use of three threaded bores allows separate loosening and angular adjustment of either the spherical collar 34 or the modular gripper. In this regard, loosening only the screw or bolt at one end of the mounting plate 27 is sufficient to loosen the adjacent spherical collar 34 or modular gripper, while maintaining the other in a secured manner. This feature allows easy and separate adjustment of the mounting plate 27 with respect to the support 165 or the modular gripper with respect to the mounting plate 27. In order to provide a tighter grip, the spherical collar 34 can have a roughened, e.g., ribbed, grooved, etc., outer surface. Making the spherical collar 34 out of a hard metal and making the mounting plate 27 out of a softer steel or an alloy of aluminum, brass, etc. will also allow better gripping between the two. It is also possible to provide open 33 with a roughened inner surface.

Figure 25A:
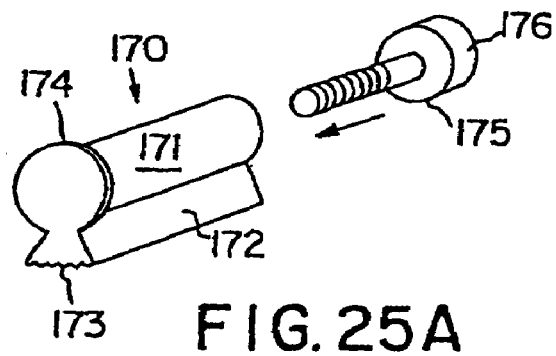
FIGS. 25a–25d are schematic views which depict a self-aligning gripper tip according to the present invention.
Figure 25B:
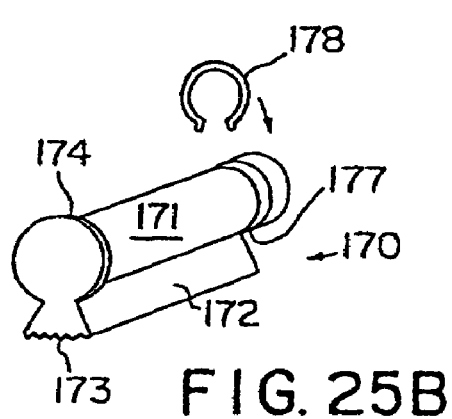
Figure 25C:
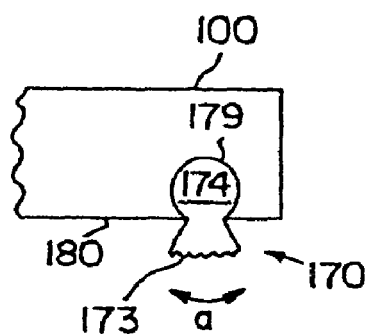
Figure 25D:
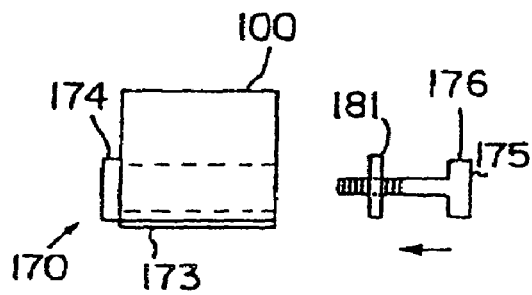

FIGS. 25a–25d depict a self-aligning gripper tip. FIGS. 25a and 25b are prospective views of different embodiments of the self-aligning gripper tip 170. FIG. 25c is a side view of the self-aligning gripper tip in the end of a gripper jaw 100. FIG. 25d is an end view of FIG. 25c which depicts how the self-aligning gripper tip 170 is secured in the end of a gripper jaw 100.

The self-aligning gripper tip 170 is designed to rotate as needed to align the gripping surface thereof with a workpiece. The self-adjusting gripper tip 170 includes a cylindrical body 171 having a projecting structure 172 along one side thereof which projecting structure 172 includes a gripping surface 173. The gripping surface 173 can be roughened, include teeth structures, grooves, or any suitable surface structures. According to the embodiment of the self-aligning gripper tip 170 depicted in FIG. 25a, one end of the cylindrical body 171 includes a flange 174, and the other end is provided with an internally-threaded bore which can receive a threaded member 175. The threaded member 175 includes a flange 176 which is used to secure the self-aligning gripper tip 170 in a gripping jaw 100, as discussed below.

In the embodiment of the self-aligning gripper tip 170 depicted in FIG. 25b, a groove 177 is provided on one end of the cylindrical body 171. This groove 177 can receive a snap ring 178 that can be used alone or in combination with a washer to secure the self-aligning gripper tip 170 in a gripper jaw 100. Although FIG. 25b depicts the use of a snap ring 178 and corresponding groove 177 on one end of the self-aligning gripper tip 170, it is to be understood that the flange 174 in FIG. 25b and in FIG. 25a could be replaced with groove 177 and a snap ring 178.

FIGS. 25c and 25d depict how the self-aligning gripper tip 170 is secured in a gripper jaw 100. As shown, the gripper jaw 100 includes a through-bore 179 which intersects a lower surface 180 thereof, so that a slot is formed at the lower surface 180. The self-aligning gripper tip 170 is inserted in through-bore 179 and secured in place by the flange 174 which abuts one side of the gripper jaw 100 and by threaded member 175 (and optional washer 181) which is threaded into the self-aligning gripper tip 170. In the alternative embodiment depicted in FIG. 25b, the snap ring 178 (an optional washer) would be used to secure one or both ends of the self-aligning gripper tip 170 in through-bore 179.

As depicted in FIG. 25c, the projecting structure 172 is allowed to rotate in the direction of double-headed arrow "a" as the cylindrical body 171 of the self-aligning gripper tip 170 rotates in through-bore 179. This rotation of the projecting structure 172 allows the gripping surface 173 to align with the surface of a workpiece.

Figure 26A:
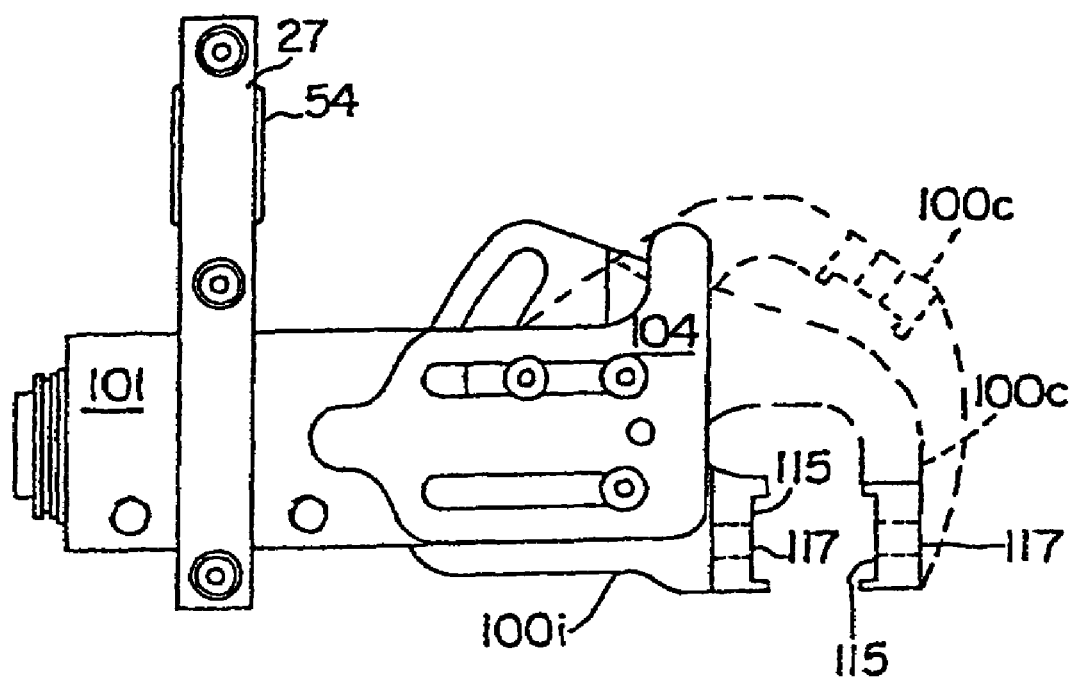
FIGS. 26a and 26b are schematic views which depict a modular fluid activated gripper having an upper pivotal gripper jaw 100c and a lower stationary gripperjaw 100i.
Figure 26B:
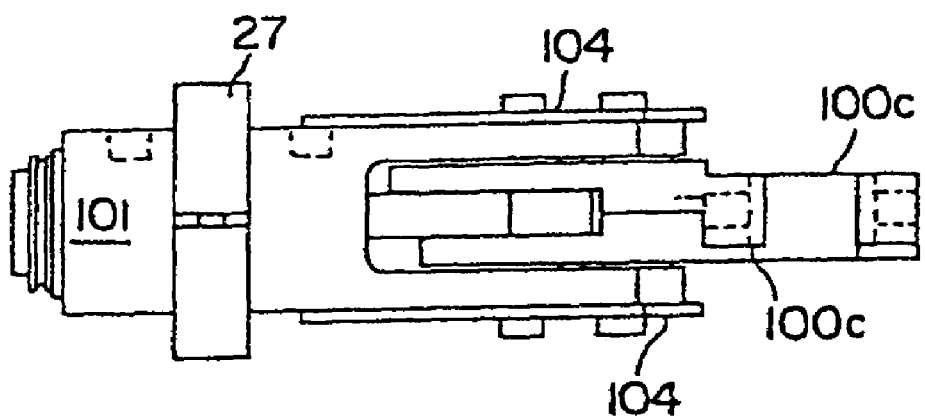

FIGS. 26a and 26b are schematic views which depict a modular fluid activated gripper having an upper pivotal gripper jaw 100c and a lower stationary gripper jaw 100i. The lower stationary gripper jaw has a gripper tip seat which faces outward or forward from the modular fluid actuated gripper, as depicted in FIG. 26b. The upper pivotal gripper jaw 100c has a curved shape which allows it to pivot so that the gripper tip seats 115 of each gripper jaw are in face-to-face alignment, as depicted in FIG. 26a, when the upper gripper jaw is in its closed position. The open position of the upper gripper jaw is depicted in phantom in FIG. 26a.

Although the present invention has been described with reference to particular means, materials and embodiments, from the foregoing description, one skilled in the art can easily ascertain the essential characteristics of the present invention and various changes and modifications may be made to adapt the various uses and characteristics without departing from the spirit and scope of the present invention as set forth in the following claims.

What is claimed is:

1. A gripper assembly which comprises:
   a body;
   an actuator coupled to the body;
   first and second opposable jaw members being pivotable in opposite directions about coincident axes;
   wherein each jaw member comprises a cam slot;
   wherein each cam slot is a space formed by opposed cam walls located in the jaw member;

wherein the cam walls form a locking portion and a pivoting portion;

wherein the distance between the cam walls of the locking portion is substantially equal to the distance between the cam walls of the pivoting portion;

a cam pin attached to the actuator and movable in first and second directions;

wherein a portion of the cam pin is located in each cam slot such that when the cam pin engages each locking portion, the locking portions act on the cam pin to selectively prevent the cam pin from moving in the first and second directions to hold the opposable jaw members.

2. The gripper assembly according to claim 1, wherein the locking portion is substantially a straight slot portion.

3. The gripper assembly according to claim 1, wherein the pivoting portion is substantially a curved slot portion.

4. The gripper assembly according to claim 1, wherein the slot is closed at each end.

5. The gripper assembly according to claim 1, further comprising a rod that is engagable by the actuator and connected to the cam pin.

6. A modular gripper assembly which comprises:
a body having a fluid driven actuator;
first and second jaw members;
wherein each of the jaw members are caused to move by the fluid driven actuator;
wherein each of the jaw members are pivotal about an axis in opposed directions;
wherein each of the jaw members has a through-slot disposed therein;
wherein each through-slot has first and second closed ends;
wherein each through-slot has first and second locking segments located between the first and second closed ends; and,
wherein the first locking segment is located adjacent the first closed end and the second locking segment is located adjacent the second closed end;
a pin extending into each through-slot, movable in first and second directions therein between the first and second closed ends; and
wherein the first locking segment selectively prevents the pin from moving in the first and second directions to hold each of the jaw members in a closed position until driven by the actuator.

7. The modular gripper assembly of claim 6, wherein the second locking segment holds each of the jaw members in an open position until driven by the actuator.

8. The modular gripper assembly of claim 6 further comprises a central pivoting segment located between the first and second locking segments.

9. A gripper assembly which comprises:
a body;
an actuator coupled to the body;
first and second opposable jaw members being pivotable in opposite directions about coincident axes;
wherein each jaw member comprises a cam slot;
wherein each cam slot is a space formed by opposed cam walls located in the jaw member;
wherein the cam walls form a locking portion and a pivoting portion;
wherein the distance between the cam walls of the locking portion is substantially equal to the distance between the cam walls of the pivoting portion;
a cam pin attached to the actuator;
wherein a portion of the cam pin is located in each cam slot and movable in first and second directions therein; and
wherein the cam pin is movable in the first direction from the pivoting portion to the locking portion of each cam slot such that when the cam pin is located in the locking portions, they selectively prevent movement of the cam pin in the second direction to hold the opposable jaw members in position.

10. The gripper assembly of claim 9, wherein each cam slot comprises a second locking portion; and
wherein the cam pin is movable in the second direction from the pivoting portion to the second locking portion of each cam slot.

11. The gripper assembly of claim 10, wherein the cam pin is selectively prevented from moving in the first direction when the cam pin is located in the second locking portions to hold the opposable jaw members in position.

12. The gripper assembly of claim 11, wherein each cam slot comprises first and second closed ends;
wherein each closed end comprises a locking portion; and
wherein, the pivoting portion of each cam slot is located between the first and second closed ends of each cam slot.

13. The gripper assembly of claim 11, wherein the opposable jaw members are held in an open position when the cam pin is prevented from moving in a first direction when located in the second locking portions.

14. The gripper assembly of claim 9, wherein the opposable jaw members are held in a closed position when the cam pin is prevented from moving in the second direction when located in the locking portions.

15. The gripper assembly of claim 9, wherein the cam pin is selectively prevented from moving into the pivoting portion by the locking portion when the cam pin is located in the locking portion.

* * * * *